(12) United States Patent
Onimaru

(10) Patent No.: US 11,087,291 B2
(45) Date of Patent: Aug. 10, 2021

(54) ACTION PLANNING AND EXECUTION SUPPORT DEVICE

(71) Applicant: HONDA MOTOR CO., LTD., Tokyo (JP)

(72) Inventor: Hiroyuki Onimaru, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 851 days.

(21) Appl. No.: 15/347,173

(22) Filed: Nov. 9, 2016

(65) Prior Publication Data
US 2017/0147989 A1    May 25, 2017

(30) Foreign Application Priority Data

Nov. 24, 2015  (JP) .............................. JP2015-229099
Nov. 24, 2015  (JP) .............................. JP2015-229100

(51) Int. Cl.
  *G06Q 10/10*     (2012.01)
  *G06Q 10/06*     (2012.01)
  (Continued)

(52) U.S. Cl.
  CPC ..... *G06Q 10/1097* (2013.01); *G01C 21/3492* (2013.01); *G01C 21/3691* (2013.01);
  (Continued)

(58) Field of Classification Search
  CPC ........ G06Q 10/10; G06Q 10/06; G01C 21/36; G01C 21/34; B60W 30/09; B60W 10/06
  (Continued)

(56) References Cited

U.S. PATENT DOCUMENTS 9,360,333 B2 *   6/2016  Tuukkanen ........ G01C 21/3415
2004/0249568 A1 * 12/2004  Endo .................. G01C 21/3492
                                                   701/410
(Continued)

FOREIGN PATENT DOCUMENTS

JP    09-014986    1/1997
JP    2001-183150  7/2001
(Continued)

OTHER PUBLICATIONS

Japanese Office Action, JP Application No. 2015-229099, dated Oct. 2, 2018, 2 pages.
(Continued)

*Primary Examiner* — Nga B Nguyen
(74) *Attorney, Agent, or Firm* — Rankin, Hill & Clark LLP

(57) ABSTRACT

The moving and arrival time at each destination during movement to destinations can be visualized in an easily understandable manner and the moving time can be adjusted. A portable device that displays action plan information which involves a movement within an arbitrary period and/or execution support information of the action plan which involves the movement includes: a display unit, a display control unit, and a spatiotemporal action diagram display control unit. The display control unit displays a time coordinate axis on the display unit, displays the action plan information, which involves the movement along the time coordinate axis, and displays speed information of all movements included in the action plan information at an arbitrary time simultaneously. The spatiotemporal action diagram display control unit receives an input for correcting the speed information of the movement.

4 Claims, 12 Drawing Sheets

(51) Int. Cl.
*G01C 21/36* (2006.01)
*G01C 21/34* (2006.01)
*G08G 1/01* (2006.01)

(52) U.S. Cl.
CPC ....... *G01C 21/3697* (2013.01); *G08G 1/0112* (2013.01); *G08G 1/0133* (2013.01)

(58) Field of Classification Search
USPC ........................................... 705/7.21
See application file for complete search history.

(56) References Cited

U.S. PATENT DOCUMENTS

| | | | | |
|---|---|---|---|---|
| 2007/0208495 | A1* | 9/2007 | Chapman | G08G 1/0104 701/117 |
| 2009/0271050 | A1* | 10/2009 | Niki | G08G 1/163 701/1 |
| 2010/0292921 | A1* | 11/2010 | Zachariah | G06Q 10/00 701/533 |
| 2010/0309022 | A1* | 12/2010 | Ishikawa | G08G 1/0104 340/911 |
| 2011/0125559 | A1* | 5/2011 | Nortrup | G08G 1/096883 705/14.1 |
| 2012/0054054 | A1* | 3/2012 | Kameyama | G01C 21/3608 705/26.1 |
| 2013/0041573 | A1* | 2/2013 | Ochi | G01S 13/345 701/117 |
| 2015/0258979 | A1* | 9/2015 | Matsunaga | B60W 10/06 701/22 |
| 2015/0353082 | A1* | 12/2015 | Lee | B60W 30/09 701/41 |
| 2017/0168492 | A1* | 6/2017 | Shitamoto | G05D 1/0221 |

FOREIGN PATENT DOCUMENTS

| | | |
|---|---|---|
| JP | 2002-149763 | 5/2002 |
| JP | 2002-365076 | 12/2002 |
| JP | 2003-050138 | 2/2003 |
| JP | 2006-327545 | 12/2006 |
| JP | 2009-211539 | 9/2009 |
| JP | 2014-108643 | 6/2014 |
| JP | 2014-191578 | 10/2014 |

OTHER PUBLICATIONS

Japanese Office Action, JP Application No. 2015-229100, dated Oct. 2, 2018, 2 pages.
Japanese Office Action dated Dec. 18, 2018, 2 pages.

* cited by examiner

ACTION PLANNING AND EXECUTION SUPPORT DEVICE

This application is based on and claims the benefit of priority from Japanese Patent Application Nos. 2015-229099 and 2015-229100, respectively filed on 24 Nov. 2015, the contents of which are incorporated herein by reference.

BACKGROUND OF THE INVENTION

Field of the Invention

The present invention relates to an action planning and execution support device for planning, schedule adjustment, and execution support of an action which involves a movement.

Related Art

Conventionally, a support technique for creating an action plan (plan) that a user moves to a scheduled place (destination) on a scheduled time, stays in the place for a scheduled period, and moves to the next scheduled place (destination) on a scheduled time using a terminal in order to create an action plan which involves a movement such as a shopping, a dining, a drive, or a travel using a moving means such as a car, a walk, a bicycle, and various means of transportation (for example, a bus, a train, a taxi, an airplane, a ferry, a railway, or the like) on a scheduled time and to adjust the schedule has been realized.

For example, Patent Document 1 discloses a travel plan creation device including: a map database 21, a travel plan condition database 22 in which a moving means, a speed ("fast," "normal," and "slow") at which the moving means moves, a moving speed determined based on the moving means and the speed of the movement, a staying time ("long," "normal," and "short"), and the like are selected and set in advance, a destination priority database 23 in which a plurality of items of place information having a priority allocated thereto are stored, an input means 10 that inputs a departure place, a departure time, an arrival place, an expected arrival time, and a destination, and a processing means 30 that calculates a path for moving from a departure place to an arrival place via a destination and a required movement time using the data input by the input means 10, and, when the planned time exceeds a scheduled time, subtracts a predetermined staying time at a destination sequentially by referring to the priority level of the place information in the destination priority database 23 in ascending order of priority levels so that the planned time falls within the scheduled time. In the travel plan creation device disclosed in Patent Document 1, when the travel plan does not fall within the scheduled time, the travel plan is reconfigured manually, semi-automatically, or automatically.

Moreover, Patent Document 2 discloses a travel plan creation device 300 which combines a plurality of events to create a travel plan, the travel plan creation device including: an event information storage unit 321 in which position information at which an event is executed is recorded, an event selecting unit 333 that selects an event included in the travel plan, an execution time setting unit 341 that sets an execution time period for executing the selected event, a moving time calculation unit 334 that calculates an expected moving time required for movement between events based on the position information and the execution time period of each of the selected events, a determination unit 342 that determines whether the execution time period can be set based on the execution time information indicating the set execution time period and the predicted moving time information indicating the calculated moving time, an execution time adjustment unit 343 that adjusts the execution time period, a moving time setting unit 344 that determines one or two or more routes in which the user can move between events using a moving time search engine and sets a movable time period of each route, and a display control unit 332 that displays information in a route display field R. In the travel plan creation device disclosed in Patent Document 2, the execution time adjustment unit 343 adjusts the execution time period by allowing a user to drag a specific button P1 (the starting time of the event execution time period) or P2 (the ending time of the event execution time period) displayed on a time table T of which the horizontal axis indicates a time axis, and the moving time setting unit 344 determines one or two or more routes in which the user can move between events based on the adjusted execution time period and sets the movable time period of each route.

Moreover, Patent Document 3 discloses a vehicle navigation device 1 in which, even when an ignition key of a vehicle is turned off, information on a change in traffic information such as congestion information, for example is repeatedly output to determine whether traffic information has been received and to determine whether the traffic information on a destination route has been changed, and when the traffic information on the destination route is changed, a required travel time of the destination route and a stayable time in each stopover place are calculated, and when the stayable time is changed, information on the change in the stayable time is output to a cellular phone of the user away from the vehicle via a communication device, for example. In the vehicle navigation device disclosed in Patent Document 3, the stayable time is calculated according to a traffic condition which is ever changing, and the information on the change in the stayable time is output when the stayable time is changed.

Patent Document 1: Japanese Unexamined Patent Application, Publication No. 2002-149763

Patent Document 2: Japanese Unexamined Patent Application, Publication No. 2009-211539

Patent Document 3: Japanese Unexamined Patent Application, Publication No. 2002-365076

SUMMARY OF THE INVENTION

The conventional technique aims to guide an optimal route which focuses on the arrival time only from the current time when a multi-modal route based on a moving means such as a car, a walk, a bicycle, and various means of transportation (for example, a bus, a train, a taxi, an airplane, a ferry, and a railway) is introduced. However, the moving means is selected according to the shortest route only, and the user may select the moving means based on the user's preference, time, cost, and other restrictions (passenger's restrictions, physical conditions, and the like). For example, the user may select the moving means by prioritizing the user's preference that the user wants to move by a private car purchased recently, an airplane because an airplane is practical when moving a long distance, or a train because a train is convenient and inexpensive.

In contrast, in the technique disclosed in Patent Document 1, the travel plan creation result merely shows an expected arrival time at each of a departure place, a candidate destination, and an arrival place. Thus, it is difficult to understand whether the moving speed ("fast," "normal," or "slow") of the moving means selected and set in advance corresponds to the user's expectation, and whether the retrieval result after the moving means is selected and set and the created travel schedule correspond to the user's desire for movement such as the user's preference and convenience. For example, when the user selects the user's moving speed with time from prepared options, the moving speed (for example, 30 km/h) is automatically set. The technique merely provides a condition setting template for calculate the subsequent required time, and it is difficult to understand the relation among the moving time, the moving means, and the moving speed.

Moreover, in the technique disclosed in Patent Document 1, when the prepared option "fast, normal, or slow" does not correspond to the user's expectation, it is difficult to make the travel plan to correspond to the user's desire such as preference or convenience. That is, the user can check whether the travel plan corresponds to the user's desire after the user obtains a result displayed when the user inputs conditions to the travel plan condition DB 22 and presses on a travel plan create button. Moreover, it takes a considerable amount of time when the user further refines the obtained result (FIG. 14, S13).

Moreover, in the technique disclosed in Patent Document 2, icons TA1, TB1, and TC1 indicating the moving time periods displayed in the time table T merely indicate the moving time, and the moving time between events is displayed in the route display field R as a required time. Thus, it is difficult for the user to understand whether the travel schedule corresponds to the user's desire related to the moving speed such as the user's preference or convenience.

Furthermore, in the technique disclosed in Patent Document 2, although operation buttons P1 and P2 are provided at the start and the end of an event, since the movement itself is not adjusted, it is difficult to adjust the movement itself so as to correspond to the user's desire.

Moreover, although the technique disclosed in Patent Document 3 relates to navigation of vehicles and outputs a message including the content of changes, this technique does not display changes in the movement and arrival time at each stopover place when the moving means is changed.

Furthermore, although the technique disclosed in Patent Document 3 automatically changes the moving time and the staying time at a destination based on the traffic information during movement by a vehicle, the user cannot adjust the movement plan itself with a simple operation during planning.

The present invention has been made in view of such a problem. An object of the present invention is to provide an action planning device, an action planning system, an action planning method, and an action planning program for creating, adjusting, and supporting the execution of an action plan which involves a movement to visualize the state of movement between respective destinations in an easily understandable manner so that the user can immediately understand the relation among a moving time, a moving means, and a moving speed during execution of an action plan, the user can immediately check whether the action plan corresponds to the user's desire related to the movement such as the user's preference and convenience and whether the moving means is appropriate, and the user can adjust the movement itself between respective destinations with a simple operation so as to correspond the user's desire.

(1) An electronic device (a "portable device 2" or an "on-board navigation device 3" to be described later) that displays action plan information which involves a movement within an arbitrary period and/or execution support information of the action plan which involves the movement, the electronic device including: a display unit (a "display unit 24" or a "display unit 34" to be described later); and a display control unit (a "display control unit 206" or a "display control unit 306" to be described later) in which the display control unit displays a time coordinate axis on the display unit, displays the action plan information which involves the movement along the time coordinate axis, and displays speed information of an arbitrary movement included in the action plan information at an arbitrary time on the same screen.

According to the electronic device of (1), by displaying the speed information of the movement on the display unit, the user can immediately understand whether the movement is relatively slow or unhurried or relatively fast or hurried. Due to this, the user can check whether the moving speed corresponds to the movement desired by the user (for example, a desire that since the user moves along an unfamiliar path, the user wants to drive at a speed approximately 10 to 15% lower than a predetermined upper limit speed).

(2) The electronic device of (1) in which the display control unit displays a 2-dimensional coordinate space including the time coordinate axis and a moving speed coordinate axis which is different from the time coordinate axis on the display unit, the display control unit displays moving speeds of the respective movements at an arbitrary moving time on the 2-dimensional coordinate space as a speed display line, and a coordinate value on the time axis and a coordinate value on the moving speed axis corresponding to an arbitrary point on the speed display line correspond to the arbitrary moving time in the action plan and a moving speed at the moving time.

According to the electronic device of (2), the moving speed at an arbitrary time is displayed on the 2-dimensional coordinate space. Due to this, the user can immediately understand with the naked eyes whether the moving speed is slow or fast.

(3) The electronic device of (1) in which the display control unit displays moving speed limit information at an arbitrary time along the time coordinate axis displayed on the display unit together with the speed information of the movement at the arbitrary time.

According to the electronic device of (3), by outputting (displaying) the moving speed limit information so as to overlap the speed information of the movement, it is possible to improve the accuracy of the prediction or the execution support. By doing so, the user can check whether the movement can be realized or not and prevent the unrealizable movement from being scheduled. For example, the user cannot move at a speed exceeding the legal speed limit by a car. Moreover, by adjusting the starting time and the arrival time of the movement, the user can schedule a movement which avoids a line of congestion. For example, it is possible to extend the moving time before and after the congestion so that the moving speed does not exceed the moving speed limit information at an arbitrary time.

(4) The electronic device of (3) in which the moving speed limit information includes moving speed limit information calculated based on moving speeds of other vehicles.

According to the electronic device of (4), by adding the moving speed information of the other vehicles, it is possible to improve the accuracy of the prediction or the execution support.

(5) The electronic device of (4) in which the moving speed limit information calculated based on the moving speeds of the other vehicles includes past storage information of the moving speeds of a subject vehicle and the other vehicles or prediction information calculated based on the storage information.

According to the electronic device of (5), by adding the past storage information of the moving speed of the subject vehicle and the other vehicles or the prediction information calculated based on the storage information, it is possible to improve the accuracy of the prediction or the execution support.

(6) The electronic device of (4) in which the moving speed limit information calculated based on the moving speeds of the other vehicles includes prediction information calculated based on movement information of other vehicles traveling at a recent or current time point ahead of a subject vehicle at the recent or current time point.

According to the electronic device of (6), by adding the FCD information (FCD) at the recent or current time point, it is possible to improve the accuracy of execution support.

(7) The electronic device of any one of (1) to (3) in which the electronic device further includes: a destination setting instruction unit (a "destination setting instruction unit 203" or a "destination setting instruction unit 303" to be described later) for inputting an initial value of speed information of the movement in advance in order to calculate the action plan which involves the movement.

According to the electronic device of (7), since the electronic device includes an interface capable of allowing the user to input an initial value of the moving speed information in order to calculate the action plan which involves the movement, it is possible to perform adjustment or execution support for schedules capable of applying the user's desire more satisfactorily.

(8) An electronic device (a "portable device 2" or an "on-board navigation device 3" to be described later) that displays action plan information which involves a movement within an arbitrary period and/or execution support information of the action plan which involves the movement, the electronic device including: a display unit (a "display unit 24" or a "display unit 34" to be described later); and a display control unit (a "display control unit 206" or a "display control unit 306" to be described later), wherein the display control unit displays speed information of an arbitrary movement included in the action plan information at an arbitrary time on the same screen, and the display control unit receives an input for correcting the speed information of the movement.

According to the electronic device of (8), by displaying the speed information of the movement on the display unit, the user can immediately understand whether the movement is relatively slow or unhurried or relatively fast or hurried. When the movement is not a movement preferred (desired) by the user, since it is possible to adjust the movement itself, it is possible to meet the desire more satisfactorily. For example, the user can adjust the moving speed when the moving speed does not correspond to the movement desired by the user (for example, a desire that since the user moves along an unfamiliar path, the user wants to drive at a speed approximately 10 to 15% lower than a predetermined upper limit speed).

(9) The electronic device of (8) in which the display control unit displays moving speed limit information at an arbitrary time together with the speed information of the movement at the arbitrary time displayed on the display unit.

According to the electronic device of (9), by outputting (displaying) the limit information together with the speed information, it is possible to check whether the movement can be realized and prevent the unrealizable movement (for example, a movement at a speed exceeding a legal speed limit by a car or a movement at a speed exceeding an upper speed limit at which the user can travel due to congestion) from being scheduled. Moreover, it is possible to schedule a movement which takes a change in congestion due to adjustment or the like of the starting or arrival time of the movement into consideration.

(10) The electronic device of (9) in which the moving speed limit information includes moving speed limit information calculated based on moving speeds of other vehicles.

According to the electronic device of (10), by adding the moving speed information of the other vehicles, it is possible to improve the accuracy of the prediction or the execution support.

(11) The electronic device of (10) in which the moving speed limit information calculated based on the moving speeds of the other vehicles includes past storage information of the moving speeds of a subject vehicle and the other vehicles or prediction information calculated based on the storage information.

According to the electronic device of (11), by adding the past storage information of the moving speed of the subject vehicle and the other vehicles or the prediction information calculated based on the storage information, it is possible to improve the accuracy of the prediction or the execution support.

(12) The electronic device of (11) in which the moving speed limit information calculated based on the moving speeds of the other vehicles includes prediction information calculated based on movement information of other vehicles traveling at a recent or current time point ahead of a subject vehicle at the recent or current time point.

According to the electronic device of (12), by adding the FCD information (FCD) at the recent or current time point, it is possible to improve the accuracy of execution support.

(13) The electronic device of (8) in which the display control unit displays an interface on the display unit so as to allow a user to correct the speed information of the movement displayed on the display unit.

According to the electronic device of (13), since the electronic device includes an interface which allows the user to input the speed information, it is possible to perform adjustment or execution support for schedules capable of applying the user's desire more satisfactorily.

(Viewpoint of Display)

According to the present invention, action planning for creating, adjusting, and supporting the execution of an action plan which involves a movement, which was expressed two-dimensionally on a map in the conventional navigation system can be expressed as a 3-dimensional framework which includes a moving speed axis and a time axis. By doing so, it is possible to visualize the state of movement between respective destinations in an easily understandable manner, immediately understand the relation among the moving time, the moving means, and the moving speed, check whether the action plan corresponds to the user's desire related to movement such as the user's preference and convenience, and immediately check whether the moving means is appropriate.

(Viewpoint of Pinch Input)

Moreover, according to the present invention, action planning for creating, adjusting, and supporting the execution of an action plan which involves a movement can be expressed as a 3-dimensional framework which includes a moving speed axis and a time axis and can be adjusted by the user. By doing so, it is possible to immediately understand the relation among the moving time, the moving means, and the moving speed, check whether the action plan corresponds to the user's desire related to movement such as the user's preference and convenience, immediately check whether the moving means is appropriate, and adjust the movement itself between respective destinations with a simple operation so as to correspond to the user's desire.

DETAILED DESCRIPTION OF THE INVENTION

[First Embodiment]

Hereinafter, a preferred embodiment of an action planning system of the present invention will be described with reference to FIGS. 1 to 12.

[Functional Configuration of Action Planning System 100]

A functional configuration of an action planning system 100 according to a preferred embodiment of the present invention will be described.

Figure 1:
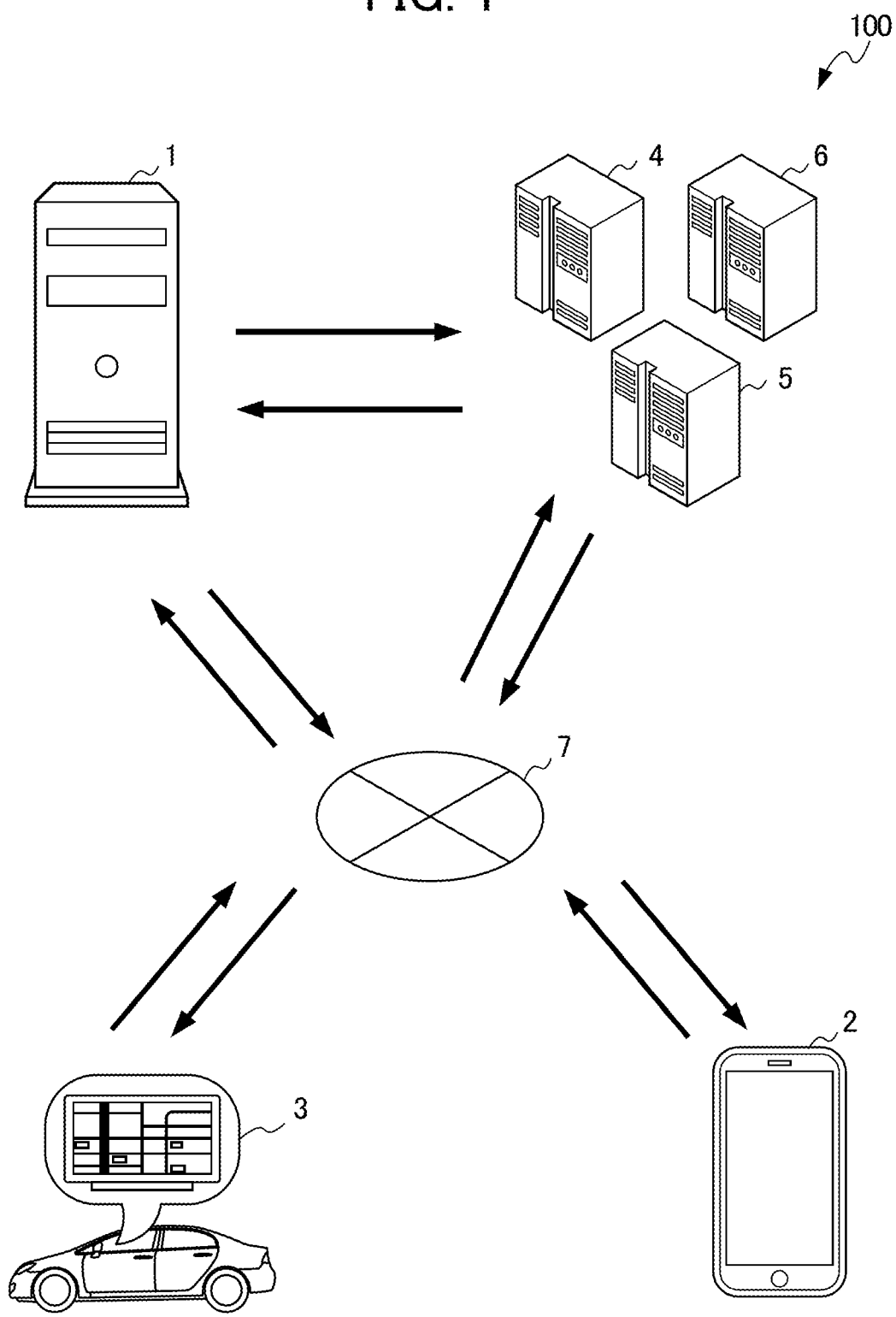
FIG. 1 is a diagram illustrating a system configuration of an action planning system 100.

As illustrated in FIG. 1, the action planning system 100 is configured to include an action planning and navigation server system 1, a portable device 2, an on-board navigation device 3 mounted on a vehicle, a floating car data (FCD) server system 4, a traffic information center system 5, a public transportation information center system 6, and a network 7. Here, FCD means data such as position information, traffic information, a travel history, and a travel speed of a probe-mounting vehicle (hereinafter also referred to as a "probe car") transmitted in each predetermined period and in each predetermined travel segment from the probe car. In the action planning system 100, any one of the portable device 2 and the on-board navigation device 3 or both may be present. In the present embodiment, although the portable device 2 is described mainly, the on-board navigation device 3 has a similar configuration.

The action planning and navigation server system 1 transmits and receives information to and from the portable device 2 and/or the on-board navigation device 3 via a communication unit 12. The action planning and navigation server system 1 generates an action plan for going out for a destination based on the choice of the destination by the portable device 2 and/or the on-board navigation device 3. Moreover, the action planning and navigation server system 1 generates route information, a spatiotemporal action diagram, and the like based on the action plan and distributes and transmits the same to the portable device 2 and/or the on-board navigation device 3. Here, specifically, the "spatiotemporal action diagram" indicates a diagram in which a space (destinations), a period indicating an arrival time, a staying time, and a departure time at each destination when moving in the space (between destinations), and a moving speed at a certain time point during movement between destinations are illustrated at the same time.

In the embodiment of the present invention, although the action planning and navigation server system 1 is realized as one server, the action planning and navigation server system 1 may be realized as a distributed processing system in which the respective functions of the action planning and navigation server system 1 are distributed appropriately to a plurality of servers. Moreover, the respective functions of the action planning and navigation server system 1 may be realized on a cloud using a virtual server function or the like. Furthermore, the action planning and navigation server system 1 may be realized as a server system including a plurality of servers such as web servers, application servers, or database servers. The functions of the action planning and navigation server system 1 may be mounted on the portable device 2 and/or the on-board navigation device 3.

The portable device 2 is a cellular phone, a smartphone, a tablet terminal, a personal digital/data assistance (PDA), a note PC (laptop computer), and other portable electronic devices, and includes an electronic device having a wireless communication function. A user terminal may include a television and a monitor in addition to the portable device so that the user terminal can be operated on a large screen. The on-board navigation device 3 mounted on the vehicle includes a personal digital/data assistance (PND). Action planning and navigation programs are installed in the portable device 2 and the on-board navigation device 3, respectively, and an action plan can be created and executed and navigation such as route guidance from a current position to a destination can be performed based on a user's request. The action planning and navigation programs may be installed in advance. Moreover, the action planning and navigation programs may be appropriately downloaded as necessary when transmitting and receiving data to and from the action planning and navigation server system 1.

The FCD server system 4 collects and stores floating car data (FCD) such as position information, traffic information, a travel history, and a travel speed of a probe-mounting vehicle (probe car) transmitted in each predetermined period and in each predetermined travel segment from the probe car. The FCD server system 4 calculates, based on the collected FCD, past traffic information (statistical data such as the number of traveling vehicles, a required travel time, and congestion information in a certain time period and in each road link), current traffic information (the number of traveling vehicles, a required travel time, congestion information, traffic control information, weather information, and the like in each road link at a current time point), and future predicted traffic information (prediction information such as the number of traveling vehicles, a required travel time, congestion information, traffic control information, and weather information in each road link in the future) and includes a traffic information database including these items of traffic information data. The FCD server system 4 provides the traffic information data stored in the traffic information database to the action planning and navigation server system by transmitting data via the network 7 or sending a storage medium having the information stored therein.

The traffic information center system 5 is a system that collects and provides road traffic information on road traffics operated by a public institution that manages traffic information. The traffic information center system 5 provides various types of road traffic information to the action planning and navigation server system 1 by transmitting data via the network 7 or sending a storage medium having the information stored therein. The traffic information center system 5 is not limited to one system but is intended to include a system provided by an arbitrary information center that provides traffic information.

The public transportation information center system 6 is a system that collects and provides an operating state or the like of a means of transportation operated by a public transportation (for example, a bus, a train, a taxi, an airplane, a ferry, a railway, or the like). The public transportation information center system 6 provides a timetable and/or an operation schedule, an operating state, and the like of various means of transportation to the action planning and navigation server system 1 by transmitting data via the network 7 or sending a storage medium having the information stored therein. Moreover, the public transportation information center system 6 is not limited to one system but is intended to include a system provided by an arbitrary information center that provides transportation information.

The action planning and navigation server system 1 may be configured to access the traffic information database of the FCD server system 4, the traffic information center system 5, or the public transportation information center system 6 via the network 7 (or a connection interface unit (not illustrated)).

Next, the respective constituent elements will be described.

<Action Planning and Navigation Server System 1>

Figure 2:
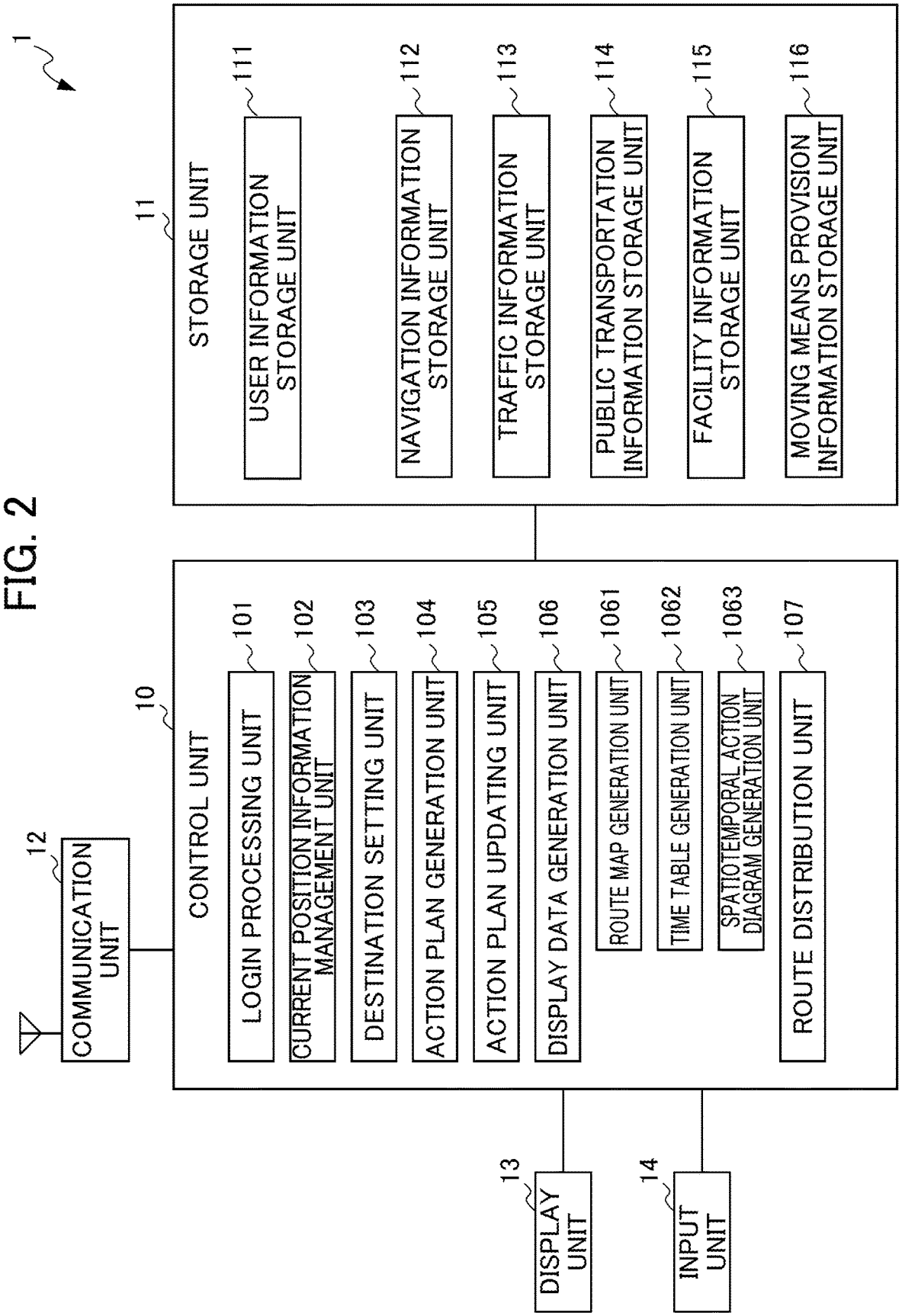
FIG. 2 is a diagram illustrating a configuration of an action planning and navigation server system 1.

As illustrated in FIG. 2, the action planning and navigation server system 1 includes at least a control unit 10, a storage unit 11, and a communication unit 12. Moreover, the action planning and navigation server system 1 may include a display unit 13 and an input unit 14, for example.

The control unit 10 is configured as a processor including a CPU, a RAM, a ROM, an I/O, and the like. The CPU executes navigation programs read from the RAM, the ROM, or the storage unit 11, and during execution of the programs, reads information from the RAM, the ROM, and the storage unit 11, writes information to the RAM and the storage unit 11, and exchanges signals with the communication unit 12, the display unit 13 and the input unit 14.

The control unit 10 executes the action planning and navigation programs to allow the action planning and navigation server system 1 to function as predetermined means (hereinafter referred to collectively as an "action planning and navigation processing unit"). Moreover, the control unit 10 executes the action planning and navigation programs to allow the action planning and navigation server system 1 to execute predetermined steps (hereinafter referred to collectively as an "action planning and navigation processing step"). The details thereof will be described later.

Various storage areas such as a user information storage unit 111, a navigation information storage unit 112, a traffic information storage unit 113, a public transportation information storage unit 114, a facility information storage unit 115, and a moving means provision information storage unit 116 are secured in the storage unit 11.

The user information storage unit 111 stores a subscriber information database that manages user information (for example, a user ID, a user name, a user gender, a current address, a portable device ID, an on-board navigation device ID, a family structure, an age structure, and the like) of each user who accesses the action planning and navigation server system 1 using the portable device 2 (or the on-board navigation device 3), for example. Moreover, the user information storage unit 111 stores position information and the like during movement of a user. Furthermore, the user information storage unit 111 stores various types of data (for example, a destination setting data file, action plan data, and the like described later) set and generated by the action planning system 100 for each user ID or each portable device ID (on-board navigation device ID).

The navigation information storage unit 112 stores navigation map information, road link information, and the like in advance. The map information includes road network data and the like including display map data for displaying a background such as roads and road maps, position information of nodes (for example, intersections, curves, endpoints, and the like) and type information thereof, position information of links which are paths connecting respective nodes and type information thereof, and link cost data and the like relating to cost information (for example, distance, required time, and the like) of all links.

Past traffic information (for example, statistical data such as the number of traveling vehicles, a required travel time, and congestion information in each time period and in each road link), current traffic information (the number of traveling vehicles, a required travel time, congestion information, traffic control information, weather information, and the like in each road link at a current time point), and future predicted traffic information (prediction information such as the number of traveling vehicles, a required travel time, congestion information, traffic control information, and weather information in each road link in a near future) provided (or received) from the FCD server system 4, the traffic information center system 5, the public transportation information center system 6, and the like are stored in the traffic information storage unit 113 together with a recording time point at which the traffic information is received. The action planning and navigation server system 1 may be configured to access the traffic information database of the FCD server system 4, the traffic information center system 5, or the public transportation information center system 6 via the network 7 (or a connection interface unit) to acquire data.

The public transportation information storage unit 114 stores a timetable and/or an operation schedule, operating state information, and the like of a public transportation (a bus, an airplane, a ferry, a railway, and the like).

The facility information storage unit 115 stores a facility information database including identification information (hereinafter also referred to as a "facility ID") selected as a destination by a user, a facility name, a facility category, a facility telephone number, a facility address, facility business hours, position information specified by latitude, longitude, and the like, menus provided by a facility if the facility is a restaurant, facility information on goods service or the like. The moving means provision information storage unit 116 stores moving means provision information on a system or a service which provides moving means (for example, a rental car, a rental bicycle, or the like) with or without a charge when a person or a group of people moves.

The communication unit 12 is connected to a cellular phone network, a wireless LAN, or the like, for example, and has a communication protocol for connecting to the portable device 2 and the on-board navigation device 3 via a wireless base station, a wireless LAN router, or the like which is not illustrated and a communication protocol or the like capable of connecting to a network (which may be a wireless or cable network) for performing transmission and reception (data communication) of packet data or the like with the FCD server system 4, the traffic information center system 5, and the like.

Hereinafter, the functions of the control unit 10 will be described from the viewpoint of an action planning and navigation processing unit. The description based on the viewpoint of the action planning and navigation processing step (method) will not be provided since the same description is applied to the action planning and navigation processing step by replacing "unit" with "step".

The control unit 10 includes a login processing unit 101, a current position information management unit 102, a destination setting unit 103, an action plan generation unit 104, an action plan updating unit 105, a display data generation unit 106, and a route distribution unit 107. Moreover, the display data generation unit 106 is configured to include a route map generation unit 1061, a time table generation unit 1062, and a spatiotemporal action diagram generation unit 1063.

<Login Processing Unit 101>

The login processing unit 101 executes a login process from the portable device 2 (or the on-board navigation device 3) to perform a process of connecting to the portable device 2 (or the on-board navigation device 3).

<Current Position Information Management Unit 102>

The current position information management unit 102 receives current position information, current time information, and the like of the portable device 2 (or the on-board navigation device 3) transmitted from a position information updating unit 202 (or 302) of the portable device 2 (or the on-board navigation device 3) and manages the same for each user ID by storing in the user information storage unit 111. The information may be managed for each portable device ID or each on-board navigation device ID instead of the user ID.

<Destination Setting Unit 103>

The destination setting unit 103 creates destination list data based on a departure place, an arrival place, a destination which is a moving destination desired by a user, and a staying time in the destination input from the portable device 2 (or the on-board navigation device 3) by the user. Here, it is assumed that the user has selected N destinations. Here, a departure place and an arrival place are also input as one of desired destinations for the sake of convenience. A departure place will be also referred to as a "0-th destination", an n-th destination will be also referred to as an "n-th destination" (1≤n≤N)and an arrival place will be also referred to as an "(N+1)th destination" unless specifically stated otherwise. Moreover, a moving means and a moving time from an (n−1)th destination to an n-th destination will be also referred to as an n-th moving means and an n-th moving time (1≤n≤N+1), respectively.

(Setting of Destination and Staying Time)

More specifically, the destination setting unit 103 displays, to the user, a screen for inputting a departure place, a destination, an arrival place, and the like via the portable device 2 (or the on-board navigation device 3). In this case, the destination setting unit 103 may be configured to generate a candidate destination list by retrieving data corresponding to the user's preference, conditions, and the like from the facility information database stored in the facility information storage unit 115 based on the user's preference, conditions, and the like input via the portable device 2 (or the on-board navigation device 3) and display the generated candidate destination list to the user via the portable device 2 (or the on-board navigation device 3) so that the user selects a desired stopover destination. In this case, the destination setting unit 103 may allow the user to select a desired stopover destination (facility) and input a staying time in the facility.

(Setting of Reference Place)

Furthermore, the destination setting unit 103 sets a reference place for action planning and a departure time or an arrival time in the reference place, or an arrival time and/or a departure time at a priority destination input from the portable device 2 (or the on-board navigation device 3) by the user. Here, the reference place refers to a destination, a departure place, or an arrival place which serves as a reference prioritized by the user in an action plan. For example, when the user prioritizes a shopping store (destination) during action planning, the store (destination) is set as a reference place. Moreover, a departure place may be set as a reference place when the user prioritizes the departure place (or a departure time), and an arrival place may be set as a reference place when the user prioritizes the arrival place (or an arrival time).

(Setting of Moving Means)

Furthermore, the destination setting unit 103 temporarily sets an n-th moving means input from the portable device 2 (or the on-board navigation device 3) by the user. Here, examples of the moving means include a car, a motorcycle, a bicycle, a walk, a public transportation (a bus, an airplane, a ferry, a railway, and the like), and the like. The car, the motocycle, and the bicycle may be fee-based services like taxis and rental services. When a moving means such as an airplane, a ferry, or a railway is selected, the destination setting unit 103 may set the moving means so that the departure time or the arrival time thereof is prioritized.

The moving means may be selected by a time prioritizing method such that a walk is selected when there is a sufficient time to reach a destination and an automobile is selected when there is no sufficient time to reach a destination. Moreover, the destination setting unit 103 may allow the user to select the moving means by prioritizing the user's preference (for example, the user wants to move by a private car purchased recently. Moreover, when a moving means is selected, the destination setting unit 103 may set a priority level of a plurality of requirements (for example, a user's convenience, time, a cost, geological conditions, and the like) in advance and select the moving means according to the priority level. When a moving means from a departure place to an arrival place is an automobile, the destination setting unit 103 sets a moving means from a departure place (0-th destination) to an arrival place ((n+1)th destination) as an automobile.

Moreover, the destination setting unit 103 may select the moving means according to a moving speed. For example, when a moving speed is equal to or lower than 6 km/h, a walk is selected as the moving means. Furthermore, the destination setting unit 103 may select an upper limit (lower limit) of the moving speed. When a public transportation is used, the upper limit is set by a timetable. Moreover, in the case of vehicles, the upper limit is restricted by a legal speed limit, a cruisable speed in the event of congestion, and the like. Moreover, the destination setting unit 103 may allow the user to set the upper limit (lower limit) of the moving speed according to the user's preference (for example, poor traffic conditions, consideration for passengers).
(Setting of Movement Starting and Ending Time and Setting of Restrictions on Moving Time)

When a moving means is selected, the destination setting unit 103 can fixedly set a departure or arrival time of a movement by the moving means preferentially based on the type (for example, a public transportation such as an airplane, a ferry, or a railway) of the moving means such as an airplane, a ferry, or a railway. Moreover, the destination setting unit 103 can fixedly set an arrival or departure time of a movement at a destination preferentially according to restrictions (for example, when the starting or ending time of an event is determined) of an event or the like in the destination or a personal convenience (for example, when the user wants to prioritize staying in the destination).

When the starting or ending time of the movement at a destination is fixedly set by the destination setting unit 103 according to the type of a moving means, a personal convenience, or the like, and when the moving speed is adjusted by the user according to a pinch input via the portable device 2 (or the on-board navigation device 3) as will be described later, the action plan updating unit 105 can ensure that the starting or ending time of the movement fixedly set preferentially is not affected or influenced. When the departure time or the arrival time fixedly set preferentially is to be changed inevitably, it is preferable to obtain permission of the user.
(Setting of Changeable Item During Adjustment of Moving Speed)

Moreover, when the moving speed is adjusted by the user according to a pinch or the like input via the portable device 2 (or the on-board navigation device 3) as will be described later, the destination setting unit 103 can set any one of "All" wherein an entire action plan (a departure time at a departure place and an arrival time at an arrival place) can be changed and "Partial (before and after)" wherein an arrival time or a departure time at an immediately next destination can be changed. In this case, it is preferable that the departure time or the arrival time fixedly set preferentially is not automatically changed according to a pinch input.

The relation between the setting by the destination setting unit 103 and the change in the arrival time or the departure time at a destination when the moving speed is adjusted by a pinch input or the like will be described later.
(Setting of Recommedation Function)

Moreover, the destination setting unit 103 sets a refueling recommendation function ON according to an instruction from the user. As will be described later, when the refueling recommendation function is set ON and a gas station is present on a route included in the action plan data or near the user's home, the action planning and navigation server system 1 (the action plan generation unit 104) can include the gas station in the action plan data as a stopover place on the route. By doing so, the portable device 2 (or the on-board navigation device 3) can display a refueling period or a refueling place during the route guidance.
(Setting of Route)

Furthermore, the destination setting unit 103 temporarily sets a route from a positional relation between respective destinations between a departure place and an arrival place based on the set reference place. The destination setting unit 103 may temporarily set the route to respective destinations between a departure place and an arrival place by allowing the user to input the route to respective destinations from the departure place to the arrival place from the portable device 2 (or the on-board navigation device 3).

The destination setting unit 103 stores the data set in this manner (hereinafter referred to as "destination setting data") in the user information storage unit 111 for respective users.
<Action Plan Generation Unit 104>

The action plan generation unit 104 calculates a path and a moving time between respective destinations in the following manner based on the destination setting data set by the destination setting unit 103.
<When Moving Means is an Automobile, a Motorcycle, a Bicycle, a Walk, or the Like>

The action plan generation unit 104 calculates a route (hereinafter referred to as an "n-th route") which is an optimal route from an (n−1)th destination to an n-th destination and a moving time using the map information stored in the navigation information storage unit 112 and the past, current, and future predicted traffic information stored in the traffic information storage unit 113 (acquired by accessing the FCD server system 4 or the like via a network or the like) based on coordinate information of each destination. Here, the optimal route is, for example, a route which best satisfies a condition designated by the user such as a route in which the arrival time is the quickest, a route in which the distance is the shortest, and, when the moving means is an automobile or a motorcycle, a route in which a general road, for example, is prioritized, a route in which a toll road is prioritized, a route in which the toll of a toll road or the like is the smallest, or a route in which the $CO_2$ emission is the smallest. The condition designated by the user may be determined in advance by the action plan generation unit 104. Moreover, the action plan generation unit 104 may present a plurality of conditions and may set a condition among the presented conditions based on a user's instruction input from the portable device 2 (or the on-board navigation device 3). Moreover, the action plan generation unit 104 may calculate a plurality of n-th candidate routes and may determine an n-th route among the plurality of candidate routes based on a user's instruction input from the portable device 2 (or the on-board navigation device 3). Furthermore, as described above, when the refueling recommendation function is set ON and a gas station is present on a route included in the action plan data or near the user's home, the action plan generation unit 104 may include the gas station in the action plan data as a stopover place on the route.

When a moving time is calculated, the action plan generation unit 104 can calculate the moving time associated with the n-th route based on the moving speed set by the destination setting unit 103. Moreover, when a moving means is an automobile or a motocycle, for example, the action plan generation unit 104 can calculate the moving time associated with the n-th route based on the traffic information (for example, a required travel time) stored in the traffic information storage unit 113. Furthermore, the action plan generation unit 104 may calculate the moving time associated with the n-th route based on a standard moving speed set in advance for each moving means.
<When Moving Means is Public Transportation>

When the moving means is a public transportation (a bus, an airplane, a ferry, a railway, or the like), the action plan generation unit 104 calculates a moving time associated with the n-th route (between bus stops, stations, airports, or harbors) based on the timetable and/or the operation schedule and the like of the public transportation stored in the public transportation information storage unit 114. The action plan generation unit 104 can be configured to calculate a moving time from an (n−1)th destination to a usage point (a bus stop, a station, an airport, or a harbor) of a public transportation and a moving time from a usage point (a bus stop, a station, an airport, or a harbor) of a public transportation to an n-th destination based on a predetermined moving speed. As described above, the action plan generation unit 104 calculates a path and a moving time between respective destinations, adds a moving means, a path (route), and a moving time between respective destinations, and a staying time, a departure time, an arrival time, and the like in a destination to destination setting data to generate data (hereinafter referred to as "action plan data"), and stores the action plan data in the user information storage unit 111 for respective users.

<Action Plan Updating Unit 105>
(Application of Traffic Information)

The action plan updating unit 105 can appropriately update the action plan data based on the past traffic information, the current traffic information, and the predicted future traffic information acquired from the traffic information storage unit 113 (or by accessing the FCD server system 4, the traffic information center system 5, and the public transportation information center system 6) based on a traffic information application instruction (described later) input from the portable device 2 (or the on-board navigation device 3) before the user executes a movement action or during execution of the movement action.

When the user has not yet executed a movement action based on action plan data (that is, when (current time) (departure time)), the action plan updating unit 105 updates a departure time at the n-th destination, and a moving time, a movement route, and the like to the (n+1)th destination based on the traffic information application instruction (described later) input from the portable device 2 (or the on-board navigation device 3) and the predicted future traffic information (for example, the number of traveling vehicles, a required travel time, congestion information, traffic control information, weather information, and the like of each link). For example, when traffic control information, congestion information, or the like is present on a movement route of the action plan, the action plan updating unit 105 updates the route and the moving time to the (n+1)th destination by changing the moving speed or the route based on the traffic control information, the congestion information, or the like.

When the user is executing a movement action based on the action plan data (that is, (departure time)≤(current time) ≤(arrival time)) and the user has not yet departed from the n-th destination, the action plan updating unit 105 can change a departure time at the n-th destination, the route to the (n+1)th destination, the moving time, and the arrival time at the (n+1)th destination in order to avoid congestion, for example, based on the traffic information application instruction (described later) input from the portable device 2 (or the on-board navigation device 3), the current traffic information, and the predicted future traffic information (for example, the number of traveling vehicles, a required travel time, congestion information, traffic control information, weather information, and the like of each link). In this case, when the starting or ending time of the movement is fixedly set preferentially by the destination setting unit 103, the action plan updating unit 105 preferably updates the action plan data so that the starting or ending time of the movement fixedly set preferentially is not influenced.

For example, when traffic control information, congestion information, or the like is present on a movement route in the action plan between the n-th destination and the (n+1)th destination before a user departs from the n-th destination, the action plan updating unit 105 preferably updates the action plan by changing the moving speed, the departure time or the arrival time, the route, or the (n+1)th destination based on the traffic control information, the congestion information, or the like.

In this way, since the action plan updating unit 105 can update the action plan based on the past traffic information, the current traffic information, and the predicted future traffic information using FCD, it is possible to improve the accuracy of the prediction or the execution support of the action plan.

(Change of Moving Speed)

As will be described later, a user can change a speed display line or display speed information L1 indicating a moving speed between the n-th destination and the (n+1)th destination via the spatiotemporal action diagram displayed on the display unit 24 of the portable device 2 (or the on-board navigation device 3). The action plan updating unit 105 is configured to change the action plan data based on the changed display speed line information received via the communication unit from the portable device 2 (or the on-board navigation device 3). As described above, when the starting or ending time of the movement is fixedly set preferentially by the destination setting unit 103, the action plan updating unit 105 preferably change the action plan data so that the starting or ending time of the movement fixedly set preferentially is not influenced. When the starting or ending time of the movement or the like fixedly set preferentially is influenced by the action plan updating unit 103 and it is not possible to realize the priority level originally set by the user, the destination setting unit 103 preferably updates destination setting data according to the user's instruction and the action plan generation unit 104 preferably generates new action plan data based on the updated destination setting data. The details thereof will be described later.

As described above, in the action planning system 100, when the moving means is a vehicle, particularly, the action plan updating unit 105 updates the action plan based on the past congestion information or the like stored in the traffic information storage unit 113 or the like whereby a difference from during actual plan execution can be suppressed as much as possible. Moreover, even during plan execution, before a user departs from the n-th destination, for example, the action plan updating unit 105 updates the action plan after the (n+1)th destination based on the traffic control information, the congestion information, or the like whereby a future prospect during driving can be created.

Moreover, in the action planning system, a user can check whether the movement corresponds to the user's desire (a moving means, a moving speed, a departure time, an arrival time, and the like) via a spatiotemporal action diagram during previous planning and can adjust the moving speed (a moving means, a departure time, or an arrival time) via the spatiotemporal action diagram when the movement does not corresponds to the user's desire. For example, when the user moves along an unfamiliar path, the moving speed can be adjusted to a speed that is approximately 10 to 15% lower than a predetermined upper limit speed.

<Display Data Generation Unit 106>

The display data generation unit 106 generates a route map, a time table and/or a spatiotemporal action diagram based on the action plan data generated or updated by the action plan generation unit 104 or the action plan updating unit 105 and a display instruction (described later) input from the portable device 2 (or the on-board navigation device 3) and displays the route map, the time table, and/or the spatiotemporal action diagram on the display unit of the portable device 2 (or the on-board navigation device 3).

The display data generation unit 106 is configured to include a route map generation unit 1061, a time table generation unit 1062, and a spatiotemporal action diagram generation unit 1063.

Figure 5:
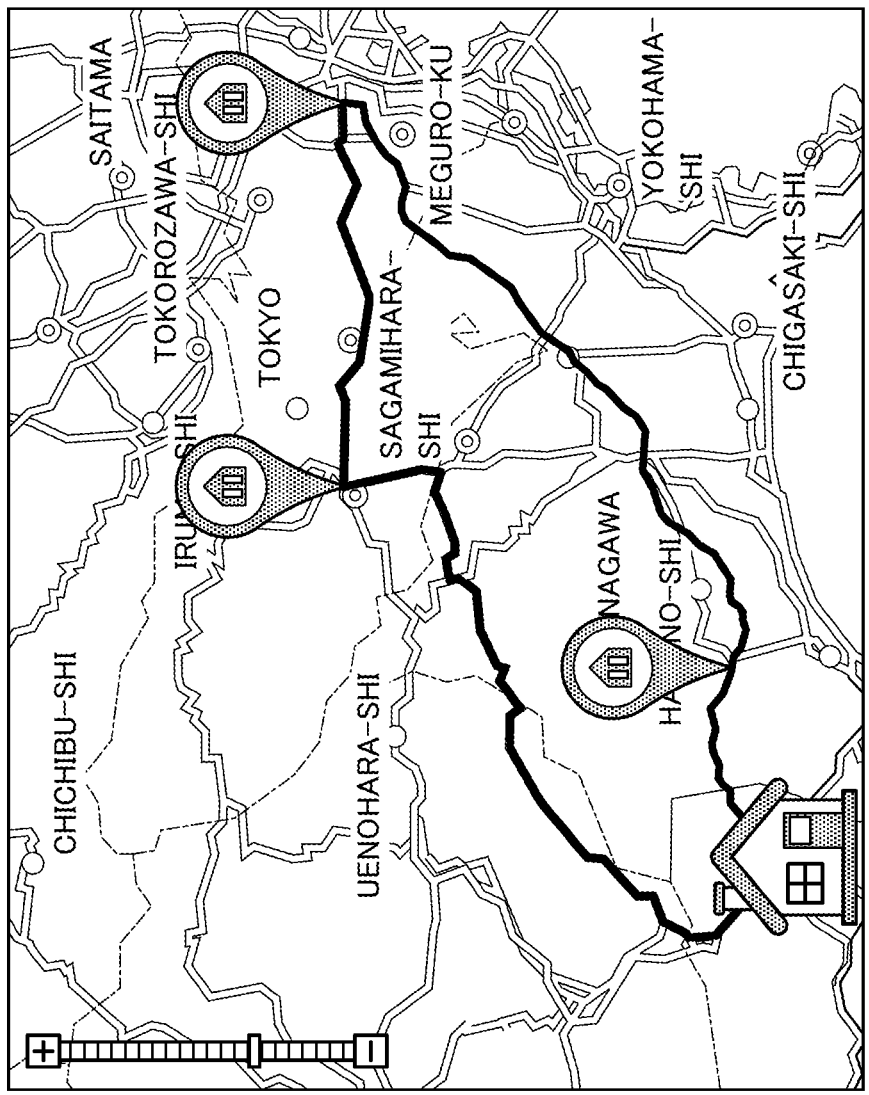
FIG. 5 is a diagram illustrating an example of a route map.

The route map generation unit 1061 generates a route map on which icons indicating a departure place, an n-th destination (1≤n≤N), and an arrival place are arranged and a path between a departure place to a first destination, a path (1≤n≤N) between an n-th destination and an (n+1)th destination, and a path between an N-th destination and an arrival place are plotted as illustrated in FIG. 5 based on the action plan data generated or updated by the action plan generation unit 104 or the action plan updating unit 105 and the map information stored in the navigation information storage unit 112 and transmits the route map to the portable device 2 (or the on-board navigation device 3) via the communication unit.

Figure 6:
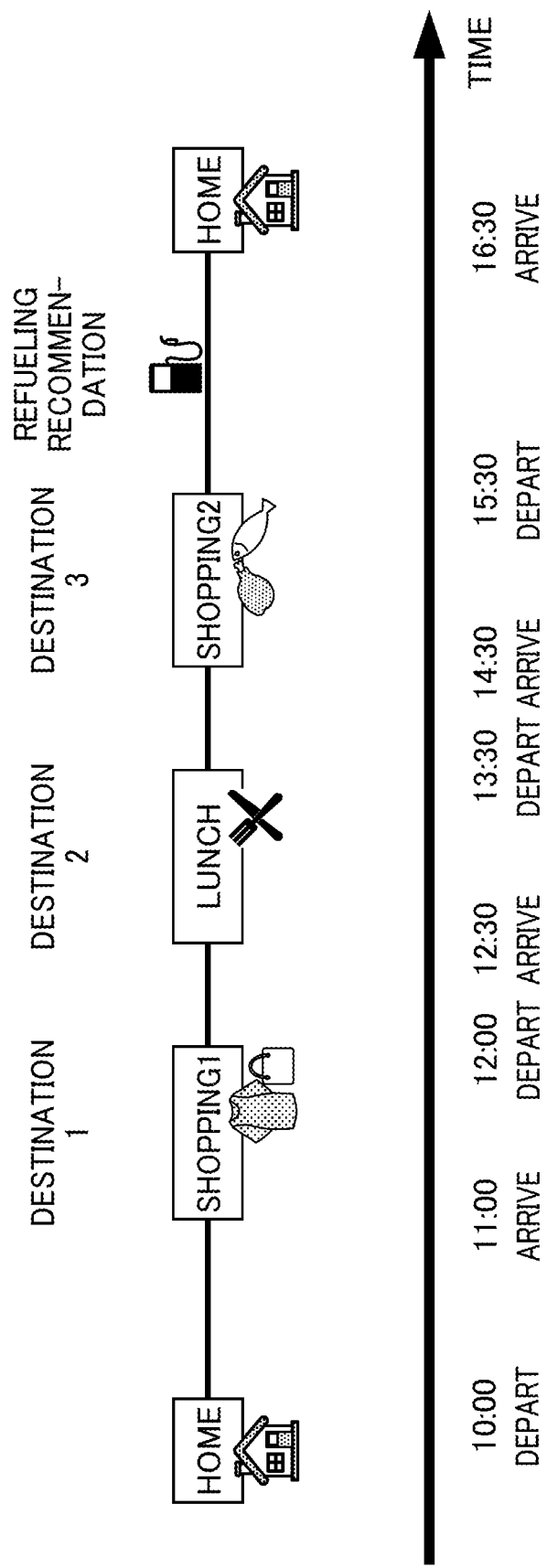
FIG. 6 is a diagram illustrating an example of a time table.

The time table generation unit 1062 generates a time table in which a departure time at a departure place, an arrival time to an n-th destination, a departure time (1≤n≤N) from the n-th destination, and an arrival time to an arrival place are arranged along the direction of a coordinate axis indicating time (hereinafter referred to as a "time axis") as illustrated in FIG. 6 based on the action plan data and transmits the time table to the portable device 2 (or the on-board navigation device 3) via the communication unit.

<Spatiotemporal Action Diagram Generation Unit 1063>

Figure 7:
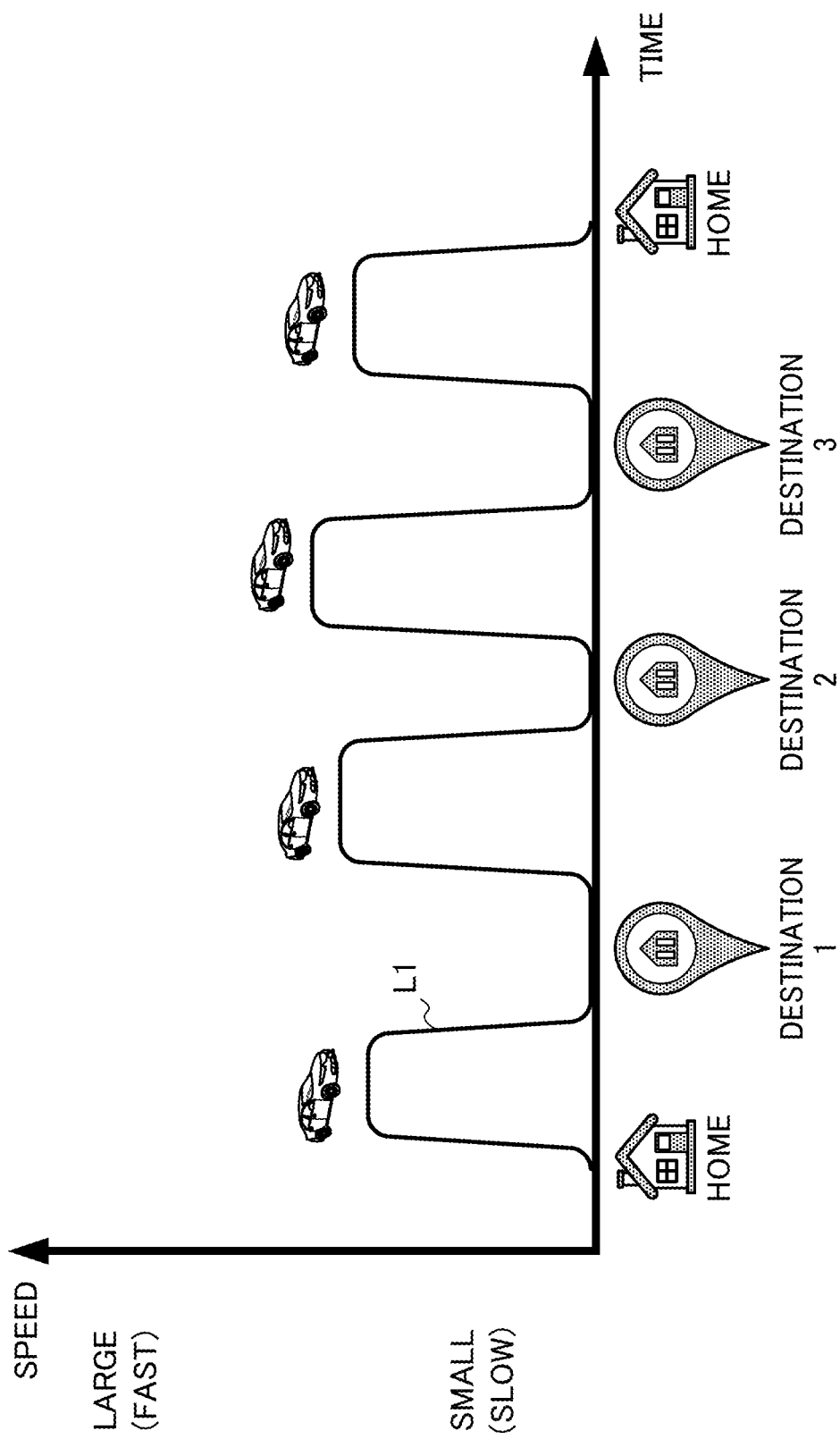
FIG. 7 is a diagram illustrating an example of a spatiotemporal action diagram.

The spatiotemporal action diagram generation unit 1063 generates a spatiotemporal action diagram based on the action plan data and the map information stored in the storage unit. As illustrated in FIG. 7, the spatiotemporal action diagram includes a speed display line or display speed information L1 indicating a moving speed at each time point of a moving time period from the n-th destination to the (n+1)th destination for each n (1≤n≤N). More specifically, the speed display line or display speed information L1 is a speed display line or display speed information L1 plotted on a 2-dimensional coordinate including a time axis and a coordinate axis indicating the magnitude of a moving speed (hereinafter referred to as a "moving speed coordinate axis") such that icons indicating a departure place, an n-th destination (1≤n≤N), and an arrival place are arranged along the time axis, and a moving speed at a corresponding time point is plotted on the moving speed coordinate axis. As illustrated in FIG. 7, the larger (faster) the speed of a moving means is, the larger the height of a mountain of the speed display line L1 becomes. By doing so, it is possible to immediately understand the degree of a moving speed with naked eyes from the spatiotemporal action diagram. When a user moves using a moving means which moves at a high speed or based on a prescribed timetable like an airplane, a ferry, or a railway, it is preferable to output (display) a moving speed regardless of a scale. Alternatively, the moving speed may be determined based on a required time including a prescribed departure and arrival time and a getting-on and off time. Moreover, in the moving speed and time graph, the moving speed during staying in a destination is preferably set to a constant speed (for example, zero) for the sake of convenience. In FIG. 7, although the moving speed line during staying in each destination indicates the speed 0, the moving speed line is depicted in contact with the axis line for the sake of convenience in order to show a line. Moreover, the spatiotemporal action diagram generation unit 1063 may be configured to set a color for identifying a moving means in advance such that, for example, a walk is identified by green, an automobile is identified by red, and a bicycle is identified by yellow. Moreover, identification information such as an icon indicating a walk, an automobile, a bicycle, or the like may be displayed in correlation with the speed display line. By doing so, a user can easily identify a moving means in each moving time period from the spatiotemporal action diagram.

<Moving Speed Limit Line or Moving Speed Limit Information (Expected Congestion Line or Congestion Prediction Information)>

Figure 8:
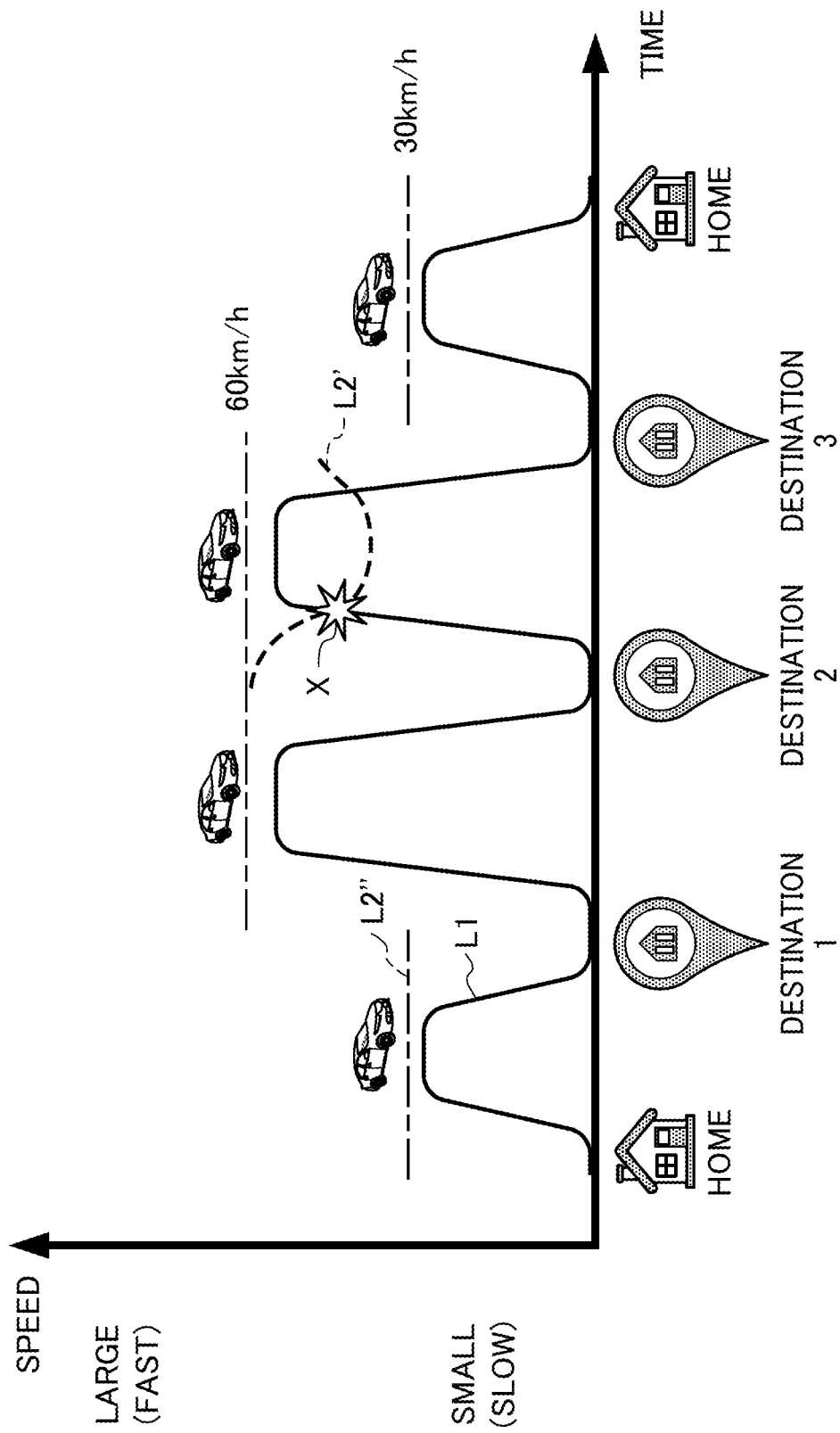
FIG. 8 is a diagram illustrating an example in which a moving speed limit line or moving speed limit information (expected congestion line or congestion prediction information) is displayed in a spatiotemporal action diagram in a superimposed manner.

As illustrated in FIG. 8, when an automobile moves along the speed display line or display speed information L1 indicated by a solid line, the spatiotemporal action diagram generation unit 1063 generates a moving speed limit line or moving speed limit information L2 (expected congestion line or congestion prediction information) indicating the upper limit of a moving speed of a traveling vehicle at a predicted presence point of the automobile at a certain time point while changing a line type such as a broken line, a color, and a shape. For example, in FIG. 8, an expected congestion line L2' is depicted by a broken line and a speed limit line L2" based on a legal speed limit is depicted by a one-dot-chain line. (In FIG. 8, similarly to FIG. 7, although the moving speed line during staying in each destination indicates the speed 0, the moving speed line is depicted in contact with the axis line for the sake of convenience in order to show a line.) Examples of the upper limit of the moving speed of the traveling vehicle include a legal speed limit or a upper limit (user's convenience) of the moving speed set by the destination setting unit 103 in addition to the moving speed based on congestion. Hereinafter, the moving speed limit line or moving speed limit information will be also referred to simply as an "expected congestion line or congestion prediction information". More specifically, the spatiotemporal action diagram generation unit 1063 generates a moving speed limit line or moving speed limit information L2 (hereinafter also referred to as an "expected congestion line or congestion prediction information") for each n (1≤n≤N) based on route information in a moving time period from an n-th destination to an (n+1)th destination, a predicted current position at each time point, the speed display line or display speed information L1 indicating the moving speed at each time point, and the current traffic information and the predicted future traffic information stored in the storage unit 11 according to an expected congestion line or congestion prediction information generation instruction (described later) input from the portable device 2 (or the on-board navigation device 3). In the spatiotemporal action diagram, when the moving speed limit line L2 is on the lower side of the speed display line L1 (the point X in the drawing) in the moving time period from the n-th destination to the (n+1)th destination, for example, it means that the user cannot move at the planned moving speed.

In this way, by outputting (displaying) the moving speed limit line or moving speed limit information L2 to overlap the spatiotemporal action diagram, it is possible to improve the accuracy of the prediction or the execution support. That is, by outputting (displaying) the moving speed limit information L2 together with the moving speed information L1, it is possible to check whether the movement can be realized as scheduled and to prevent the unrealizable movement from being scheduled. Moreover, an overlap state of expected congestion lines and the shape of expected congestion lines at the time around the overlap serve as a clue to determine whether a moving speed before and after the movement is to be increased or decreased and whether departure or arrival is to be delayed or hurried in order to avoid congestion or diminish the influence of a delayed arrival or the like due to congestion. Furthermore, by adjusting the starting time and the arrival time of the movement, it is possible to schedule a movement which avoids a line of congestion. In this case, it is possible to create a corrected plan which is easily executable or a corrected plan which has a small influence on the entire or prioritized plan or schedule by referring to the moving speed limit line or moving speed limit information L2 indicated by a broken line in such a way that it is determined whether correction of the plan is to be accelerated or delayed by referring to an increase and decrease in congestion (restriction) at a certain time.

As described above, in the present embodiment, it is possible to express action planning which involves a movement using a 3-dimensional framework which includes time and space axes. For example, the spatiotemporal action diagram, the route map, and the time table can be displayed on the display unit of the portable device 2 (or the on-board navigation device 3) at the same time. In this case, icons indicating a departure place, an n-th destination (1≤n≤N), and an arrival place on the spatiotemporal action diagram can be expressed so as to be correlated with points on the route map. Similarly, icons indicating the departure place, the n-th destination (1≤n≤N), and the departure place can be displayed on the time table and be expressed so as to be correlated with points on the route map. Moreover, the icons indicating the departure place, the n-th destination (1≤n≤N), and the arrival place on the spatiotemporal action diagram can be expressed so as to be correlated with the icons indicating the departure place, the n-th destination (1≤n≤N), and the departure place on the time table. In this way, it is possible to immediately understand the relation among a moving time, a moving means, and a moving speed and to immediately check whether an action plan corresponds to the user's desire for movement such as the user's preference and convenience and whether the moving means is appropriate. Since the route guidance diagram, the time table, and the spatiotemporal action diagram are based on the action plan data, the route guidance diagram, the time table, and the spatiotemporal action diagram are updated simultaneously with updating of the action plan data.

<Route Distribution Unit 107>

The route distribution unit 107 distributes (transmits) the route information included in the action plan data generated or updated by the action plan generation unit or the action plan updating unit 105 to the portable device 2 via the communication unit. As will be described later, the portable device 2 (or the on-board navigation device 3) performs route guidance according to the route information distributed from the route distribution unit 107. More specifically, the route distribution unit 107 preferably distributes (transmits) route information to the portable device 2 (or the on-board navigation device 3) based on a route guidance start instruction input from the portable device 2 (or the on-board navigation device 3) when a user moves from the n-th destination to the (n+1)th destination. Moreover, when a moving speed limit line or moving speed limit information is output (displayed) to overlap the spatiotemporal action diagram during movement and a moving speed or the like is adjusted, the changed route information is distributed from the route distribution unit 107.

<Portable Device 2>

Figure 3:
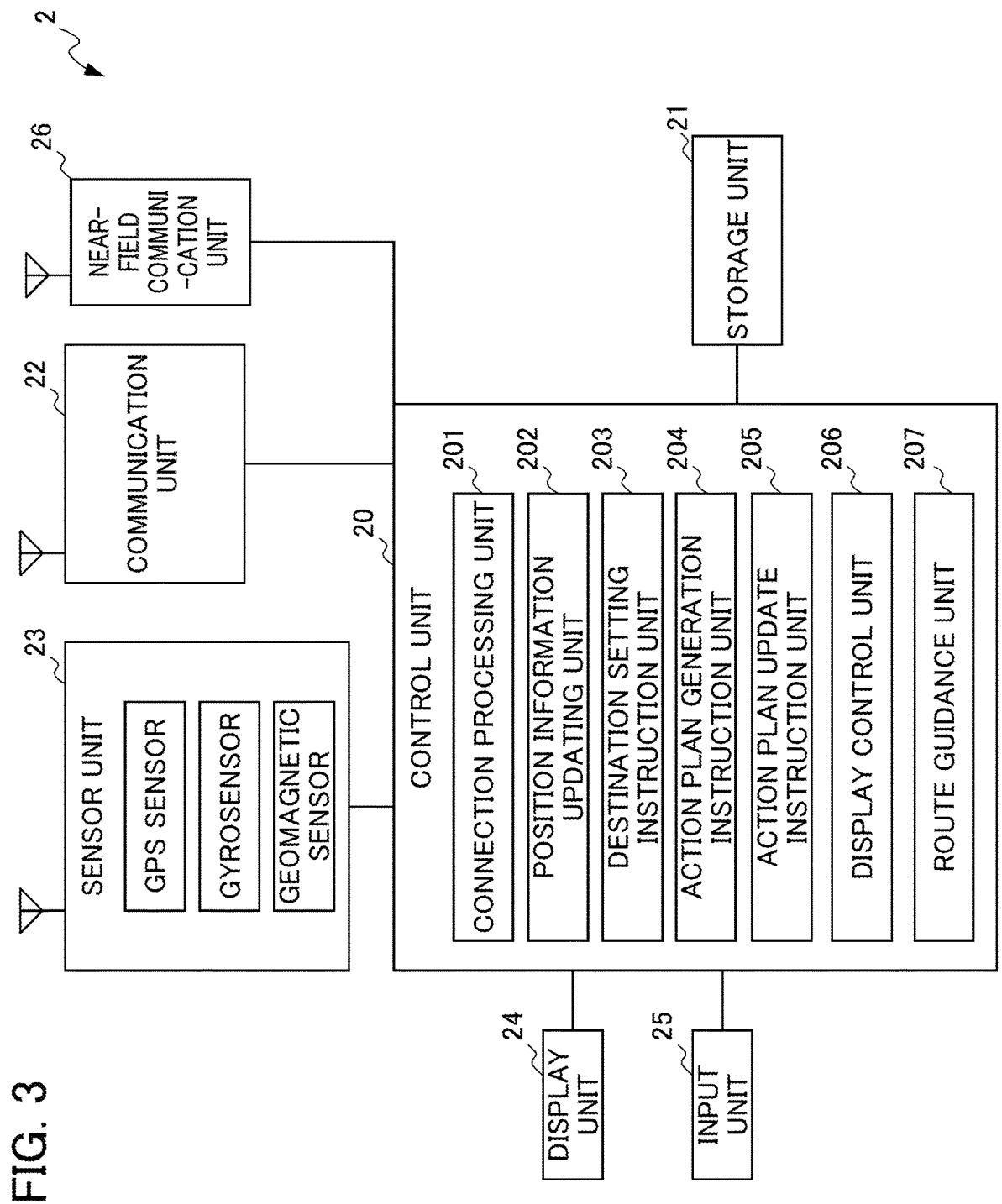
FIG. 3 is a diagram illustrating a configuration of a portable device 2.

As illustrated in FIG. 3, the portable device 2 includes at least a control unit 20, a storage unit 21, a communication unit 22, a sensor unit 23, a display unit 24, and an input unit 25.

The control unit 20 is configured as a microprocessor including a CPU, a RAM, a ROM, an I/O, and the like. The CPU executes the action planning and navigation programs read from the ROM or the storage unit 21, and during execution of the programs, reads information from the RAM, the ROM, and the storage unit 21, writes information to the RAM and the storage unit 21, and exchanges signals with the communication unit 22, the sensor unit 23, the display unit 24, and the input unit 25.

The control unit 20 executes the action planning and navigation programs to allow the portable device 2 to function as predetermined means (hereinafter referred to collectively as an "action planning and navigation processing unit"). For example, when the action planning and navigation programs are activated, it is possible to create and display an action plan in collaboration with the action planning and navigation server system 1. Moreover, when a user moves using an automobile or the like, for example, according to the action plan, route guidance based on the action plan that instructs left and right turns while displaying the current position using the position information from the sensor unit 23 can be realized. Moreover, the control unit 20 executes the action planning and navigation programs to allow the portable device 2 to execute predetermined procedures (hereinafter referred to collectively as an "action planning and navigation processing procedure"). The details thereof will be described later.

The storage unit 21 is configured as a semiconductor memory or the like and stores an operating system (OS), the action planning and navigation programs, and various items of information such as map information and position information. The action planning and navigation programs and the map information may be stored in advance in the storage unit 21 or may be acquired appropriately from the action planning and navigation server system 1. The storage unit 21 stores the action plan, the route map, the time table, the spatiotemporal action diagram, the route information, and the like transmitted or distributed from the action planning and navigation server system 1.

The communication unit 22 includes a DSP (Digital Signal Processor) and the like and is connected to a cellular phone network to perform wireless communication via a wireless base station (not illustrated) and to perform wireless communication with a server such as, for example, a VICS (registered trademark) center or the action planning and navigation server system 1. The communication unit 22 can receive data such as map information, congestion information from such a server.

The sensor unit 23 can detect the current position of the portable device 2 with the aid of a GPS sensor or a gyrosensor. The sensor unit 23 has the function of position detection means for detecting a current position, receives a GPS satellite signal using a GPS receiver (not illustrated) and measures the current position (latitude and longitude) of the portable device 2. Moreover, since a gyrosensor, a geomagnetic sensor, and the like are provided, it is possible to measure the current position of the portable device 2 by autonomous navigation. When the GPS receiver cannot measure the current position from a GPS satellite signal, it is possible to measure the current position instead of the GPS receiver. In addition, when GPS communication is not possible, it is possible to calculate the current position of the portable device 2 based on base station information acquired from the communication unit 22 using AGPS (Assisted Global Positioning System) communication.

The display unit 24 is configured as a display device such as a liquid crystal display or an organic EL panel and displays an image according to an instruction received from the control unit 20. The display unit 24 displays the route map, the time table, the spatiotemporal action diagram, the route information, and the like transmitted or distributed from the action planning and navigation server system 1.

The input unit 25 is configured as an input device (not illustrated) such as physical switches called numeric keys and a touch panel provided to be superimposed on a display surface of the display unit 24 and outputs a signal based on the user pressing of numeric keys or touching of a touch panel to the control unit 20.

The portable device 2 may include a near-field wireless unit 26 that performs non-contact communication called NFC (Near Field Communication), for example.

In recent years, the on-board navigation device 3 includes a near-field wireless unit or the like (for example, Bluetooth (registered trademark), Wi-Fi, or the like). The portable device 2 connects to the on-board navigation device 3 via the near-field wireless unit to transmit data whereby the action plan and the route guidance of the portable device 2 can be continued by the on-board navigation device 3. Conversely, the on-board navigation device 3 transmits data to the portable device 2 via the near-field wireless unit whereby the action plan and the route guidance of the on-board navigation device 3 can be continued by the portable device 2.

Hereinafter, the functions of the control unit 20 will be described from the viewpoint of an action planning and navigation processing unit. The description based on the viewpoint of the action planning and navigation processing procedure (method) will not be provided since the same description is applied to the action planning and navigation processing procedure by replacing "unit" with "step".

The control unit 20 includes a connection processing unit 201, a position information updating unit 202, a destination setting instruction unit 203, an action plan generation instruction unit 204, an action plan update instruction unit 205, a display control unit 206, and a route guidance unit 207.

<Connection Processing Unit 201>

The connection processing unit 201 executes a login process to the action planning and navigation server system 1 using a user ID and a password, for example, when an action planning and navigation program is activated by the user. The connection processing unit 201 may be configured to automatically transmit the user ID and/or the password stored in advance in the storage unit when the action planning and navigation program is activated. Moreover, the connection processing unit 201 may be configured to transmit a portable device ID during the login process. By doing so, the user ID and the portable device 2 can be correlated.

<Position Information Updating Unit 202>

The position information updating unit 202 periodically transmits, to the action planning and navigation server system 1, the user ID (or the portable device ID), the current position information of the portable device 2 calculated by the sensor unit 23, and the current time information or the like acquired from a clock unit (not illustrated) based on the route guidance start instruction input from the portable device 2, for example. The position information updating unit 202 may periodically transmit the user ID (or the portable device ID), the current position information of the portable device 2, and the current time information or the like acquired from the clock unit to the action planning and navigation server system 1 after performing a login process to the action planning and navigation server system 1.

<Destination Setting Instruction Unit 203>

The destination setting instruction unit 203 displays, to the user via the display unit 24, a guidance screen for setting destination setting information such as a reference place for action planning; a departure time or an arrival time at a reference place; an action starting and/or ending time at a prioritized destination; a departure place, a destination, and an arrival place; a route, a moving means, a moving speed, a departure time, an arrival time, and a setting of a starting and ending time of the movement at each destination; the presence of moving time restrictions; and a changeable item during adjustment of a moving speed transmitted from the action planning and navigation server system 1 (the destination setting unit 103). The destination setting instruction unit 203 transmits destination designation information input by the user via the guidance screen to the action planning and navigation server system 1 (the destination setting unit 103). Moreover, the destination setting instruction unit 203 transmits destination setting instruction information input from the user via the input unit 25 to the action planning and navigation server system 1 via the communication unit 22. For example, the destination setting instruction unit 203 can display a "refueling recommendation function ON/OFF" button, for example, on the display unit 24 and transmit a refueling recommendation function setting request to the action planning and navigation server system 1 via the communication unit 22 when the user touches on the button. The refueling recommendation function ON/OFF button may be displayed by the action plan update instruction unit 205 described later, and the refueling recommendation function setting request may be transmitted to the action planning and navigation server system 1 via the communication unit 22 when the user touches on the button.

The destination setting instruction unit 203 may specify the current position (latitude and longitude) using the sensor unit 23 to set the current position as a default departure place. Similarly, the destination setting instruction unit 203 may specify the current time and set the current time as a default departure time.

<Action Plan Generation Instruction Unit 204>

The action plan generation instruction unit 204 displays an "action plan create" button, for example, as well as the destination setting data on the display unit 24 and transmits an action plan creation instruction to the action planning and navigation server system 1 via the communication unit 22 when the user touches on the button. The displayed destination setting data can be corrected by the user. For example, a "destination setting data update" button may be displayed so that the destination setting data can be edited. In this way, the user can edit the destination setting data displayed on the display unit 24. The destination setting data changed in this manner may be transmitted to the action plan generation unit 104 so that the action plan generation unit 104 can generate an action plan based on the transmitted destination setting data. The user may input an action plan creation instruction via the input unit 25 rather than touching on the "action plan create" button on the display unit 24.

Moreover, the action plan generation instruction unit 204 displays a list of route calculation conditions for selecting a route when the action plan generation unit 104 calculates the n-th route to allow the user to select a route calculation condition, and transmits the selected route calculation condition to the action plan generation unit 104. In this case, the action plan generation instruction unit 204 may allow the user to select a route calculation condition for each route or to select a common condition for all routes.

The action plan generation instruction unit 204 displays a list of candidate routes calculated as the n-th route by the action plan generation unit 104, received from the action planning and navigation server system 1 via the communication unit on the display unit 24, allows the user to select a route, and transmits the selected route to the action plan generation unit 104. When the refueling recommendation function is set ON and a gas station is present on the route included in the action plan data or near the user's home, the action plan generation instruction unit 204 may include the gas station in the action plan data as a stopover place on the route.

<Action Plan Update Instruction Unit 205>

The action plan update instruction unit 205 displays a "traffic information application instruction" button, for example, on the display unit 24 and transmits a traffic information application instruction to the action planning and navigation server system 1 via the communication unit 22 when the user touches on the button. Similarly, the action plan update instruction unit 205 displays the "refueling recommendation function ON/OFF" button, for example, on the display unit 24 and transmits a refueling recommendation function ON instruction to the action planning and navigation server system 1 via the communication unit 22 when the user touches on the button. The user may input the traffic information application instruction or the refueling recommendation function ON instruction via the input unit 25. Moreover, as will be described later, the action plan update instruction unit 205 transmits the speed display line or display speed information changed by the user via the spatiotemporal action diagram to the action plan updating unit 105.

<Display Control Unit 206>

The display control unit 206 is configured to include a route map display control unit 2061, a time table display control unit 2062, and a spatiotemporal action diagram display control unit 2063.

The route map display control unit 2061 displays the route map received from the action planning and navigation server system 1 (the route map generation unit 1061) via the communication unit 22 on the display unit 24. FIG. 5 illustrates an example of the route map. The route map display control unit 2061 can display the route map based on known operations such as zoom-in, zoom-out, move, and rotate.

As illustrated in FIG. 6, the time table display control unit 2062 displays the time table generated by the time table generation unit 1062, received from the action planning and navigation server system 1 via the communication unit 22 on the display unit 24.

As illustrated in FIG. 7, the spatiotemporal action diagram display control unit 2063 displays the spatiotemporal action diagram generated by the spatiotemporal action diagram generation unit 1063, received from the action planning and navigation server system 1 via the communication unit 22 on the display unit 24. As described above, for example, the spatiotemporal action diagram, the route map, and the time table may be displayed simultaneously on the display unit 24 of the portable device 2. In this case, icons indicating a departure place, an n-th destination (1≤n≤N), and an arrival place on the spatiotemporal action diagram can be expressed so as to be correlated with points on the route map. Similarly, icons indicating the departure place, the n-th destination (1≤n≤N), and the departure place can be displayed on the time table and be expressed so as to be correlated with points on the route map. Moreover, the icons indicating the departure place, the n-th destination (1≤n≤N), and the arrival place on the spatiotemporal action diagram can be expressed so as to be correlated with the icons indicating the departure place, the n-th destination (1≤n≤N), and the departure place on the time table.

(Expected Congestion Line or Congestion Prediction Information Generation Instruction)

The spatiotemporal action diagram display control unit 2063 displays an "expected congestion line or congestion prediction information generation instruction" button, for example, on the display unit 24 and transmits an expected congestion line or congestion prediction information generation instruction to the action planning and navigation server system 1 via the communication unit 22 when the user touches on the button. The user may input the expected congestion line or congestion prediction information generation instruction via the input unit 25. The spatiotemporal action diagram display control unit 2063 displays the moving speed limit line or moving speed limit information L2 (the expected congestion line or congestion prediction information) generated by the spatiotemporal action diagram generation unit 1063, received from the action planning and navigation server system 1 via the communication unit 22 so as to overlap the spatiotemporal action diagram as illustrated in FIG. 8.

In this way, by outputting (displaying) the moving speed limit line or moving speed limit information L2 to overlap the spatiotemporal action diagram, it is possible to improve the accuracy of the prediction or the execution support. That is, by outputting (displaying) the moving speed limit information L2 together with the moving speed information L1, it is possible to check whether the movement can be realized as scheduled and prevent the unrealizable movement from being scheduled. Furthermore, by adjusting the starting time and the arrival time of the movement, it is possible to schedule a movement which avoids a line of congestion.

(Moving Speed Change Instruction)

Next, how the user changes the speed display line or display speed information via the spatiotemporal action diagram will be described. More specifically, when the spatiotemporal action diagram display control unit 2063 passes information such as a pinch input by the user over to the action plan update instruction unit 205, the action plan update instruction unit 205 issues an action plan update instruction to the action planning and navigation server system 1.

<Change of Moving Speed>

The user can change the speed display line or display speed information indicating the moving speed from the n-th destination to the (n+1)th destination via the spatiotemporal action diagram displayed on the display unit 24 of the portable device 2 (or the on-board navigation device 3).

<Pinch-In>

Figure 9:
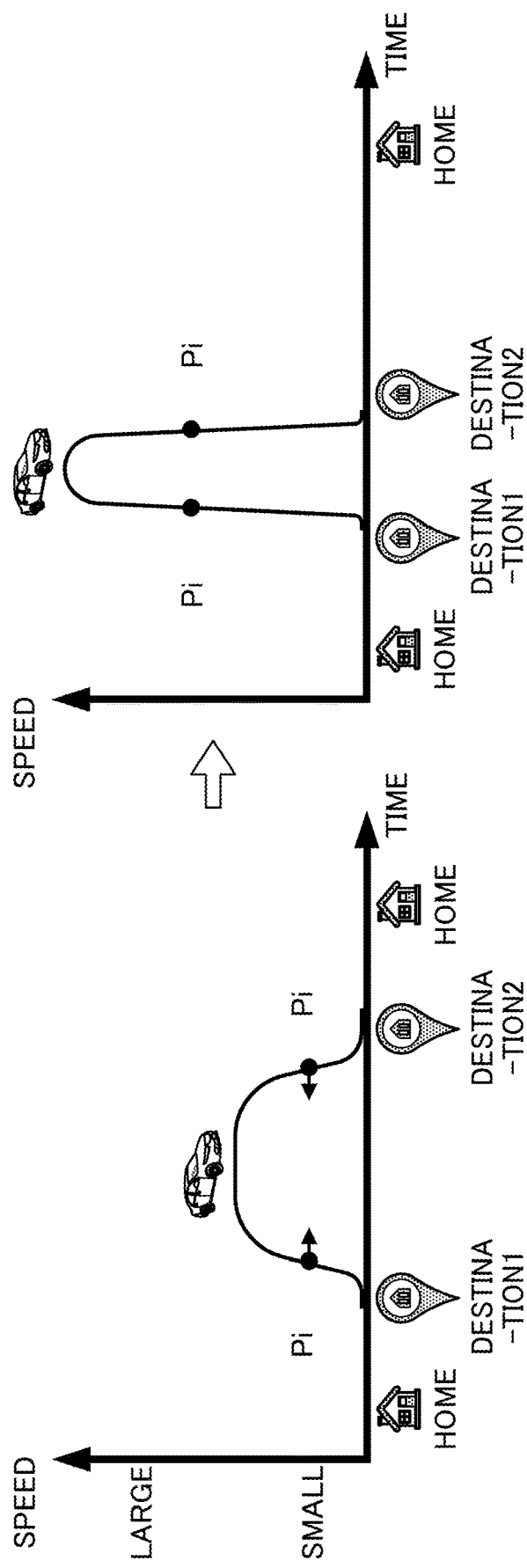
FIG. 9 is a diagram illustrating a state in which a speed display line of a spatiotemporal action diagram is pinched in to narrow the speed display line from a departure time to an arrival time from an n-th destination to an (n+1)th destination.

As illustrated in FIG. 9, the spatiotemporal action diagram display control unit 2063 narrows the speed display line between the departure time and the arrival time from the n-th destination to the (n+1)th destination in response to the user pinching-in (an operation of bringing two fingers into contact with a speed display line (the portion indicated by Pi in FIG. 9) on the screen to decrease the distance between the fingers) the speed display line between the departure time and the arrival time from the n-th destination to the (n+1)th destination, the speed display line indicating the moving speed in the spatiotemporal action diagram displayed on the display unit. In this case, as described above, when the starting or ending time of the movement at a destination is fixedly set preferentially by the destination setting unit 103, the spatiotemporal action diagram display control unit 2063 ensures that the starting or ending time of the movement fixedly set preferentially is not affected or influenced. That is, the spatiotemporal action diagram display control unit 2063 shifts the speed display line or display speed information in the direction toward a destination which is not fixedly set. For example, when the departure time of the n-th destination is fixedly set preferentially, the display of the speed display line or display speed information is changed so that the arrival time at the (n+1)th destination is brought forward.

The action plan update instruction unit 205 issues an action plan update instruction to the action planning and navigation server system 1 based on the information such as the pinch-in input or the like by the spatiotemporal action diagram display control unit 2063. By doing so, the (n+1)th moving speed can be increased. When the moving speed is increased, by displaying the moving speed limit line or moving speed limit information (the expected congestion line or congestion prediction information) so as to overlap the spatiotemporal action diagram, it is possible to adjust the moving speed so as not to exceed the moving speed limit line or moving speed limit information.

<Pinch-Out>

Figure 10:
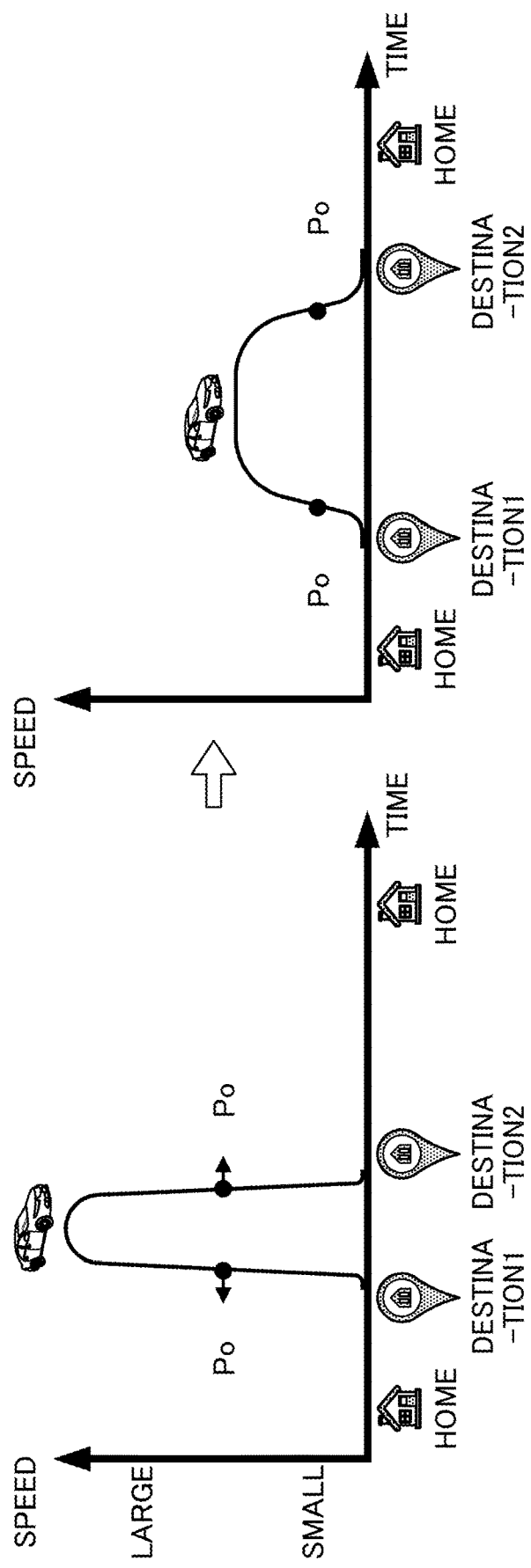
FIG. 10 is a diagram illustrating a state in which a speed display line of a spatiotemporal action diagram is pinched out to widen the speed display line from a departure time to an arrival time from an n-th destination to an (n+1)th destination.
Figure 11:
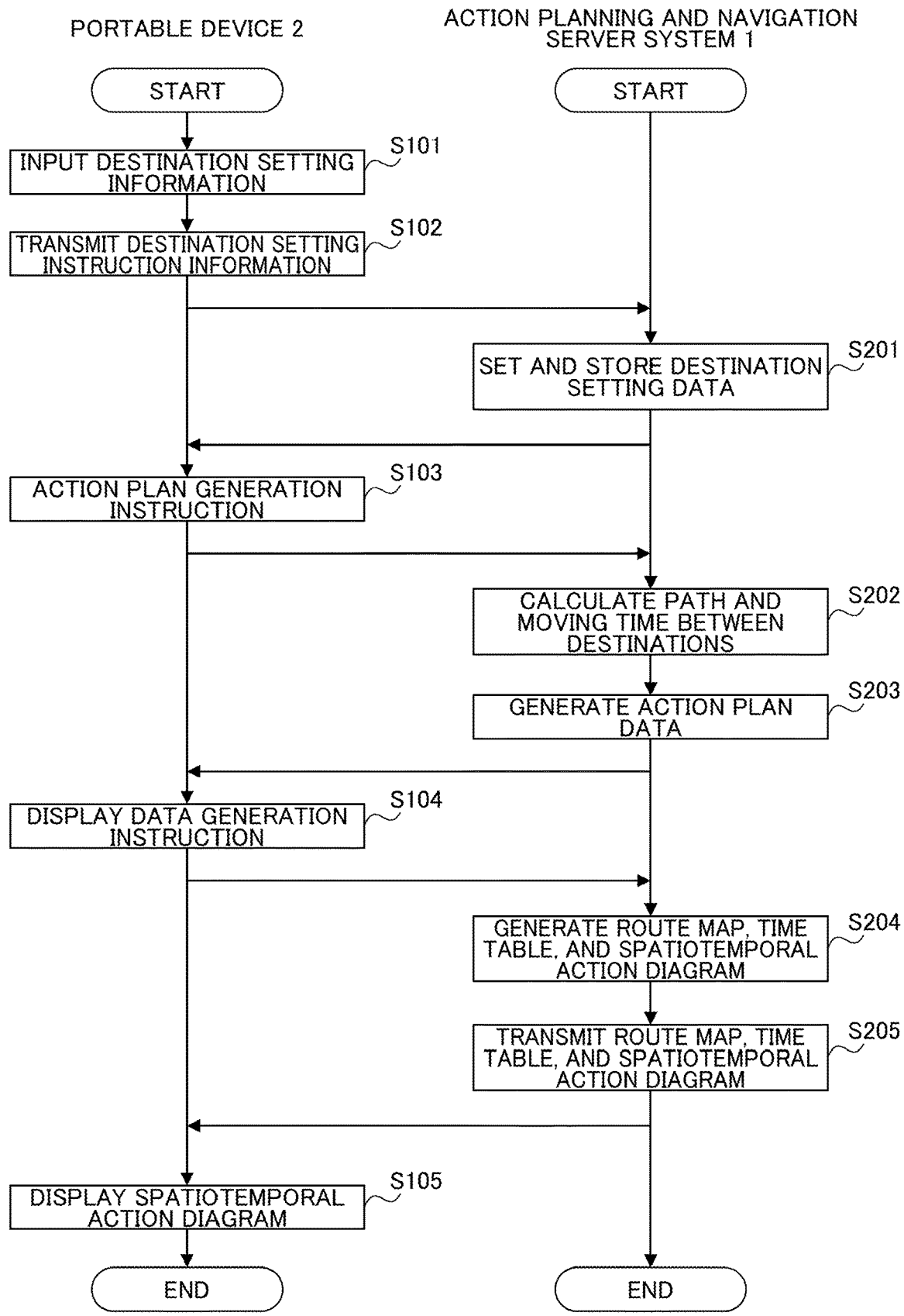
FIG. 11 is a flowchart illustrating an example of operations when an action plan is created by the action planning system 100.

As illustrated in FIG. 10, the spatiotemporal action diagram display control unit 2063 widens the speed display line between the departure time and the arrival time from the n-th destination to the (n+1)th destination in response to the user pinching-out (an operation of bringing two fingers into contact with a speed display line (the portion indicated by Po in FIG. 10) on the screen to increase the distance between the fingers) the speed display line between the departure time and the arrival time from the n-th destination to the (n+1)th destination, the speed display line being displayed on the display unit. That is, the spatiotemporal action diagram display control unit 2063 shifts the speed display line or display speed information in the direction toward a destination which is not fixedly set. In this case, for example, when the departure time of the n-th destination is fixedly set preferentially, the display of the speed display line or display speed information is changed so that the arrival time at the (n+1)th destination is brought forward.

The action plan update instruction unit 205 issues an action plan update instruction to the action planning and navigation server system 1 based on the information such as the pinch-out input by the spatiotemporal action diagram display control unit 2063. By doing so, the (n+1)th moving speed can be decreased. Even when the moving speed is decreased due to reasons such as congestion, by displaying the moving speed limit line or moving speed limit information (the expected congestion line or congestion prediction information) so as to overlap the spatiotemporal action diagram, it is possible to adjust the moving speed so as not to exceed the moving speed limit line or moving speed limit information. Moreover, when a moving means is set to be selected based on a moving speed and the moving speed is decreased, the moving means may be automatically changed (for example, change from an automobile to a walk). When the user wants to maintain the automobile continuously, the user can make setting to return to "automobile".

<Drag>

Instead of pinch-in, the spatiotemporal action diagram display control unit 2063 may narrow the speed display line between the departure time and the arrival time from the n-th destination to the (n+1)th destination in response to the user touching and dragging (an operation of bringing one finger into contact with the speed display line on the screen to move the finger in an upward direction in that state) the speed display line displayed on the screen in the upward direction. The action plan update instruction unit 205 issues an action plan update instruction to the action planning and navigation server system 1 based on the information such as the pinch-in input or the like by the spatiotemporal action diagram display control unit 2063. By doing so, the (n+1)th moving speed can be increased. When the moving speed is increased, by displaying the moving speed limit line or moving speed limit information (the expected congestion line or congestion prediction information) so as to overlap the spatiotemporal action diagram, it is possible to adjust the moving speed so as not to exceed the moving speed limit line or moving speed limit information.

<Drag>

Instead of pinch-out, the spatiotemporal action diagram display control unit 2063 may widen the speed display line between the departure time and the arrival time from the n-th destination to the (n+1)th destination in response to the user touching and dragging (an operation of bringing one finger into contact with the speed display line on the screen to move the finger in a downward direction in that state) the speed display line displayed on the screen in the downward direction. The action plan update instruction unit 205 issues an action plan update instruction to the action planning and navigation server system 1 based on the information such as the pinch-out input by the spatiotemporal action diagram display control unit 2063. By doing so, the (n+1)th moving speed can be decreased. Even when the moving speed is decreased due to reasons such as congestion, by displaying the moving speed limit line or moving speed limit information (the expected congestion line or congestion prediction information) so as to overlap the spatiotemporal action diagram, it is possible to adjust the moving speed so as not to exceed the moving speed limit line or moving speed limit information.

When both a destination arrival time and a destination departure time are not set preferentially by the user, the spatiotemporal action diagram display control unit 2063 can flexibly change the speed display line or display speed information according to the pinch input or the like.

When the range of data which can be influenced by the pinch input or the like is set to "All" by the destination setting unit 103, the spatiotemporal action diagram display control unit 2063 can change the speed display line or display speed information so that the entire action plan (the departure time at a departure place or the arrival time at an arrival place) is shifted in relation to the pinch input or the like. For example, when the n-th moving speed is decreased, the spatiotemporal action diagram display control unit 2063 can change the speed display line or display speed information so that the arrival time at the arrival place is shifted.

Moreover, when the range of data which is influenced by the pinch input or the like is set to "Partial (before and after)" by the destination setting unit 103, the spatiotemporal action diagram display control unit 2063 changes the speed display line or display speed information so that the departure time or the arrival time at the immediately next destination is shifted so as not to change the entire action plan (the departure time at the departure place or the arrival time at the arrival place) in relation to the pinch input or the like.

In this way, the action plan update instruction unit 205 transmits an instruction to the action planning and navigation server system 1 via the communication unit 22 based on the speed display line or display speed information changed by the spatiotemporal action diagram display control unit 2063. By doing so, as described above, the action plan updating unit 105 can change the (n+1)th moving speed in the action plan data to be increased or decreased based on the speed display line or display speed information changed so as to increase or decrease the (n+1)th moving speed, received from the portable device 2 (or the on-board navigation device 3) via the communication unit 12.

In this way, by providing an interface (pinch input or the like) for allowing the user to easily change the speed information, it is possible to adjust the action plan and support the execution thereof so that the user's desire is applied more satisfactorily.

<Expected Congestion Line or Congestion Prediction Information>

The spatiotemporal action diagram display control unit 2063 can change the speed display line or display speed information so that the speed display line or display speed information is positioned on the lower side than the expected congestion line or congestion prediction information when the speed display line or display speed information is positioned on the upper side than the expected congestion line or congestion prediction information. In this case, when the user accepts the changed speed display line or display speed information, the action plan update instruction unit 205 transmits an instruction to the action planning and navigation server system 1 via the communication unit 22 based on the speed display line or display speed information changed by the spatiotemporal action diagram display control unit 2063.

When the speed display line or display speed information is positioned on the upper side than the expected congestion line or congestion prediction information, for example, the action plan updating unit 105 may calculate a congestion avoidance route and create a changed action plan.

The route guidance unit 207 performs route guidance according to the route information included in the action plan data, distributed from the route distribution unit of the action planning and navigation server system 1. When the moving speed limit line or moving speed limit information is output (displayed) to overlap the spatiotemporal action diagram during movement and a moving speed or the like is adjusted according to the pinch adjustment or the like, the route guidance is performed according to the changed route information distributed from the route distribution unit.

<On-Board Navigation Device 3>

Figure 4:
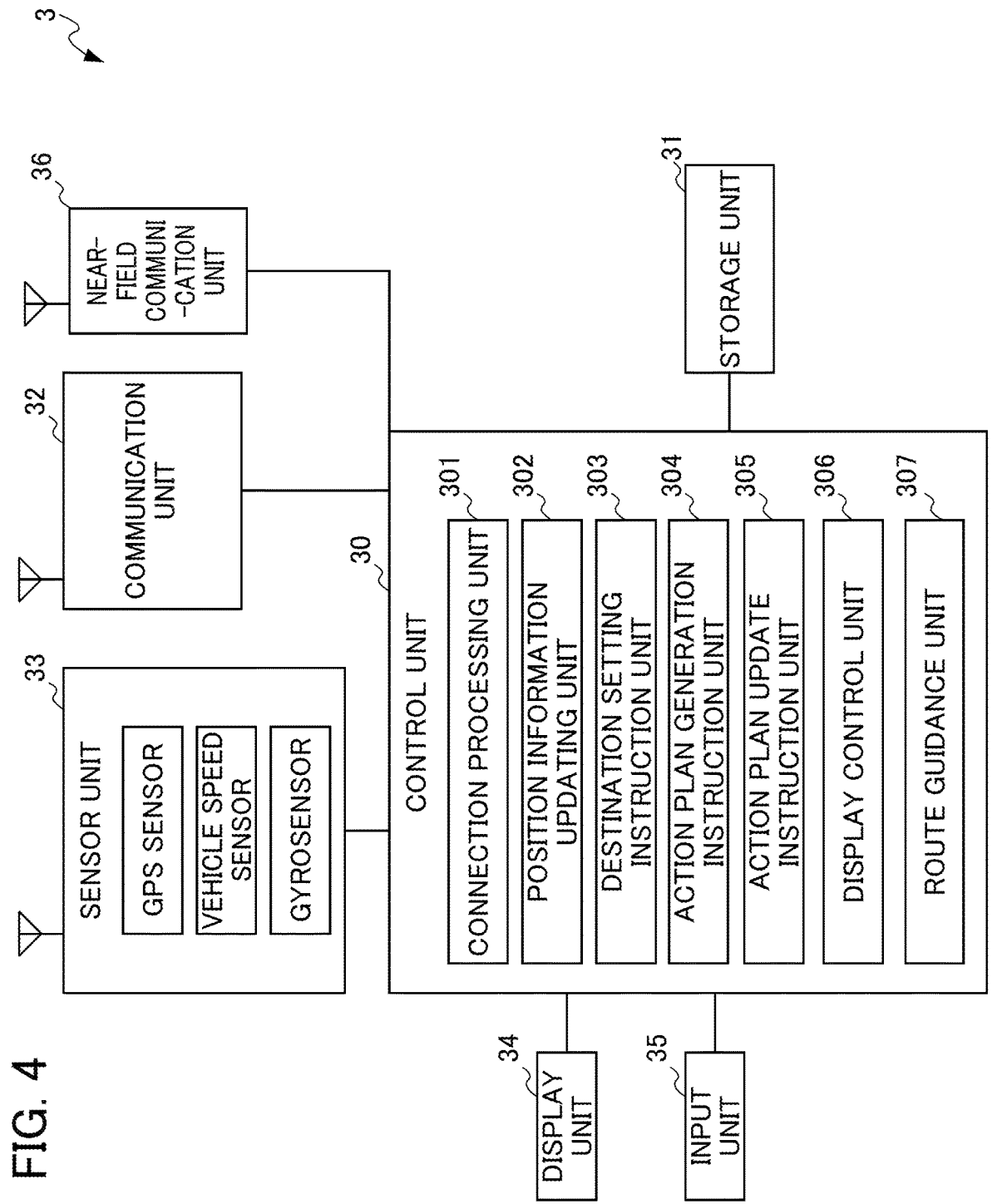
FIG. 4 is a diagram illustrating a configuration of an on-board navigation device 3.

As illustrated in FIG. 4, the on-board navigation device 3 includes at least a control unit 30, a storage unit 31, a communication unit 32, a sensor unit 33, a display unit 34, and an input unit 35.

The control unit 30 is configured as a microprocessor including a CPU, a RAM, a ROM, an I/O, and the like. The CPU executes the action planning and navigation programs read from the ROM or the storage unit 31, and during execution of the programs, reads information from the RAM, the ROM, and the storage unit 31, writes information to the RAM and the storage unit 31, and exchanges signals with the communication unit 32, the sensor unit 33, the display unit 34, and the input unit 35.

The control unit 30 executes the action planning and navigation programs to allow the on-board navigation device 3 to function as predetermined means (hereinafter referred to collectively as an "action planning and navigation processing unit"). For example, when the action planning and navigation programs are activated, it is possible to create and display an action plan in collaboration with the action planning and navigation server system 1. Moreover, when a user moves using an automobile or the like, for example, according to the action plan, route guidance based on the action plan that instructs left and right turns while displaying the current position using the position information from the sensor unit 33 can be realized.

Moreover, the control unit 30 executes the action planning and navigation programs to allow the on-board navigation device 3 to execute predetermined procedures (hereinafter referred to collectively as an "action planning and navigation processing procedure").

Programs equivalent to the action planning and navigation programs installed in the portable device 2 are installed in the on-board navigation device 3. Due to this, similarly to the portable device 2, the control unit 30 includes a connection processing unit 301, a position information updating unit 302, a destination setting instruction unit 303, an action plan generation instruction unit 304, an action plan update instruction unit 305, a display control unit 306, and a route guidance unit 307.

Moreover, similarly to the portable device 2, the display control unit 306 is configured to include a route map display control unit 3061, a time table display control unit 3062, and a spatiotemporal action diagram display control unit 3063. The on-board navigation device 3 may include a near-field communication unit 36 that performs non-contact communication called NFC (Near Field Communication), for example.

As described above, since the respective constituent elements included in the on-board navigation device 3 correspond to the respective constituent elements included in the portable device 2 and realize functions equivalent to those of the respective constituent elements included in the portable device 2, the detailed description thereof will not be provided. Hereinafter, the functions unique to the on-board navigation device 3 will be described.

<Automatic Activation>

The on-board navigation device 3 is automatically activated when an ignition switch of a vehicle is turned on (the engine is started) by the driver. The on-board navigation device 3 operates until the ignition switch of the vehicle is turned off (the engine is stopped) by the driver.

<Connection Processing Unit 301>

The connection processing unit 301 is configured to execute a login process to the action planning and navigation server system 1 using an identification number (a vehicle ID) for identifying a vehicle and a password, for example, when the on-board navigation device 3 is automatically activated and transmit the current position information of the vehicle calculated by the sensor unit 33 and the current time information or the like acquired from a clock unit (not illustrated) to the action planning and navigation server system 1.

<Position Information Updating Unit 302>

The position information updating unit 102 periodically transmits the vehicle ID, the current position information of the vehicle calculated by the sensor unit 33, and the current time information or the like acquired from the clock unit (not illustrated) to the action planning and navigation server system 1. The transmitted information may include a travelling direction of the vehicle calculated by the sensor unit 33.

<Collaboration With Portable Device 2>

As described above, both the portable device 2 and the on-board navigation device 3 include a near-field wireless unit (for example, Bluetooth (registered trademark)). Therefore, when the portable device 2 and the on-board navigation device 3 are paired with each other, a data file being executed by the portable device 2 can be transmitted to the on-board navigation device 3. By doing so, the on-board navigation device 3 can continuously perform the action plan and the route guidance of the portable device 2. Moreover, conversely, when the on-board navigation device 3 is paired with the portable device 2 via the near-field wireless unit, a data file being executed by the on-board navigation device 3 can be transmitted to the portable device 2. By doing so, the portable device 2 can continuously perform the action plan and the route guidance of the on-board navigation device 3.

When the portable device 2 and the on-board navigation device 3 are connected by tethering, a data file being executed by the portable device 2, for example, can be transmitted to the on-board navigation device 3. Similarly, a data file being executed by the on-board navigation device 3 can be transmitted to the portable device 2. By doing so, the action plan is created and updated by the portable device 2 and the updated action plan is taken over to the on-board navigation device 3 when the user departs toward a destination. During movement by an automobile, the action plan is updated by the on-board navigation device 3 as necessary and the updated action plan is taken over to the portable device 2 when the user arrives at the destination. Therefore, it is possible to adjust the action plan and support the execution thereof so that the user's desire is applied more satisfactorily.

Hereinabove, an embodiment of the respective functional units of the action planning system 100 has been described based on the configuration of the action planning and navigation server system 1, the portable device 2, the on-board navigation device 3, the FCD server system 4, the traffic information center system 5, and the public transportation information center system 6. However, the embodiment of the respective functional units of the action planning and navigation server system 1, the FCD server system 4, the traffic information center system 5, and the public transportation information center system 6 of the present invention may be deployed to be executed by one computer or a number of computers distributed to one location or a plurality of locations and connected to each other by a communication network in a distributed manner. Moreover, the respective functional units may be configured using a plurality of virtual computers on a cloud.

When the functions are processed by a plurality of computers in a distributed manner, the respective functions of the action planning and navigation server system 1, the FCD server system 4, the traffic information center system 5, and the public transportation information center system 6 can be executed by any computer. Therefore, a person skilled in the art can appropriately design allocation to computers, of the respective functions of the action planning and navigation server system 1, the FCD server system 4, the traffic information center system 5, and the public transportation information center system 6.

[Modification]

Moreover, as will be described later, the portable device 2 or the on-board navigation device 3 may include the functions of the action planning and navigation server system 1.

(Operation of Action Planning System 100)

Hereinabove, the configuration of the action planning system 100 has been described. Next, an example of the operation when the user creates an action plan will be described using the action planning system 100.

It is assumed that the user desires to execute an action plan that the user departs at the departure time 10:00 to go downtown for shopping (for example, "Shopping 1" in which the arrival time is 11:00 and the departure time is 12:00) and then has a lunch ("Lunch"), goes shopping ("Shopping 2" in which the arrival time is 14:30 and the departure time is 15:30) in the vicinity, and arrives at home at the arrival time 16:00 while having refueling on the way home. Hereinafter, an example of the operation when the action plan is created using the action planning system 100 will be described with reference to FIG. 11.

In step S101, the portable device 2 (the destination setting instruction unit 203) receives destination setting information input from the user. Here, specifically, the user's desire and the settings that can be changed are input as the destination setting information.

In step S102, the portable device 2 (the destination setting instruction unit 203) transmits the destination setting instruction information to the action planning and navigation server system 1 (the destination setting unit 103).

In step S201, the action planning and navigation server system 1 (the destination setting unit 103) sets the destination setting data based on the destination setting instruction information received from the portable device 2 (the destination setting instruction unit 203) and stores the destination setting data in the user information storage unit 111.

In step S103, the portable device 2 (the action plan generation instruction unit 204) transmits action plan generation instruction information to the action planning and navigation server system 1 (the action plan generation unit 104).

In step S202, the action planning and navigation server system 1 (the action plan generation unit 104) calculates a path and a moving time between respective destinations based on the coordinate information, the map information, the past traffic information, and the like of each destination.

In step S203, the action planning and navigation server system 1 (the action plan generation unit 104) adds the path and the moving time between the respective destinations to the destination setting data to generate action plan data and stores the action plan data in the user information storage unit 111.

In step S104, the portable device 2 (the display control unit 206) transmits display data generation instruction information to the action planning and navigation server system 1 (the display data generation unit 106).

In step S204, the action planning and navigation server system 1 (the display data generation unit 106) generates a route map, a time table, and a spatiotemporal action diagram.

In step S205, the action planning and navigation server system 1 (the display data generation unit 106) transmits the generated route map, time table, and spatiotemporal action diagram to the portable device 2.

In step S105, the portable device 2 (the display control unit 206) displays the spatiotemporal action diagram on the display unit 24. By doing so, the user can determine whether particularly the departure and arrival time at a reference place or the starting and ending time of a prioritized action (the arrival and departure time at a destination) corresponds to the user's desire based on the displayed spatiotemporal action diagram. When any one of the time points or the moving speed does not correspond to the user's desire, as described above, the user can correct the action plan by inputting a pinch operation or the like to the displayed spatiotemporal action diagram.

Figure 12:
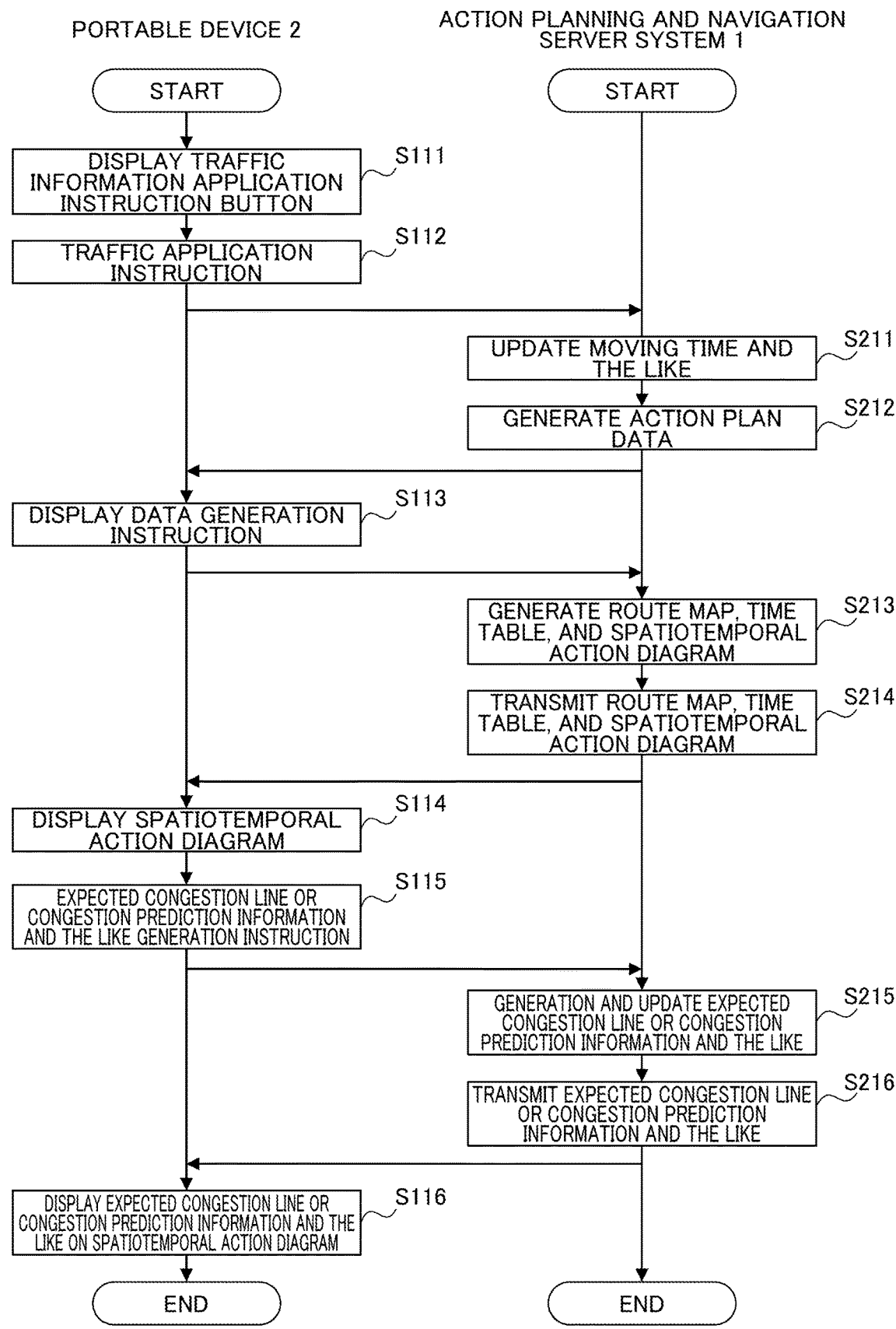
FIG. 12 is a flowchart illustrating an example of operations when an action plan is updated by the action planning system 100.

Next, an example of the operation when the action planning system 100 updates the action plan before the user starts a movement according to the action plan and during execution of the movement after the start of the movement will be described with reference to FIG. 12. FIG. 12 is a flowchart illustrating an example of the operation when the action plan is updated.

In step S111, the portable device 2 (the action plan update instruction unit 203) displays a "traffic information application instruction" button on the display unit 24.

In step S112, the portable device 2 (the action plan update instruction unit 203) transmits the traffic information application instruction to the action planning and navigation server system 1 via the communication unit 22 when the user touches on the button.

In step S211, the action planning and navigation server system 1 (the action plan updating unit 105) updates the moving time and the route by changing the moving speed or the route based on the current traffic information including the past data and the predicted future traffic information.

In step S212, the action planning and navigation server system 1 (the action plan updating unit 105) stores the updated action plan data in the user information storage unit 111.

In step S113, the portable device 2 (the display control unit 206) transmits the display data generation instruction information to the action planning and navigation server system 1 (the display data generation unit 106).

In step S213, the action planning and navigation server system 1 (the display data generation unit 106) generates the route map, the time table, and the spatiotemporal action diagram.

In step S214, the action planning and navigation server system 1 (the display data generation unit 106) transmits the updated route map, time table, and spatiotemporal action diagram to the portable device 2.

In step S114, the portable device 2 (the display control unit 206) displays the updated spatiotemporal action diagram on the display unit 24. By doing so, the user can determine whether the moving speed corresponds to the user's desire based on the updated spatiotemporal action diagram. When any one of the time points or the moving speed does not correspond to the user's desire, as described above, the user can correct the action plan by inputting a pinch operation or the like to the displayed spatiotemporal action diagram.

In step S115, the portable device 2 (the display control unit 206) transmits the expected congestion line or congestion prediction information generation instruction input by the user to the action planning and navigation server system 1 (the spatiotemporal action diagram generation unit 1063).

In step S215, the action planning and navigation server system 1 (the spatiotemporal action diagram generation unit 1063) generates expected congestion line or congestion prediction information data.

In step S216, the action planning and navigation server system 1 (the spatiotemporal action diagram generation unit 1063) transmits the generated expected congestion line or congestion prediction information data to the portable device 2.

In step S114, the portable device 2 (the display control unit 206) displays the expected congestion line or congestion prediction information data on the display unit 24 so as to overlap the spatiotemporal action diagram. By doing so, the user can determine whether the departure and arrival time at a reference place or the starting and ending time of a prioritized action (the arrival and departure time at a destination) corresponds to the user's desire based on the displayed spatiotemporal action diagram. When the speed display line is on the upper side than the expected congestion line or congestion prediction information, as described above, the user can correct the action plan by inputting a pinch operation or the like to the displayed spatiotemporal action diagram. For example, when a car is selected as a moving means for a round trip and an unfamiliar traffic situation to a destination is expected, a slow speed can be set to an outward route and a standard speed can be set to a homeward route. In this case, when a congestion is expected in the homeward route, it is possible to easily understand whether it is necessary to correct the entire plan or the plan before and after the congestion from the relation between the crossing expected congestion lines or congestion prediction information and to easily understand the corrected plan. Moreover, when a fixed-route bus is selected and a congestion is expected, since it is not possible to change the moving speed of the bus before and after the congestion, it is possible to easily understand whether it is necessary to correct the entire plan or the plan before and after the congestion in term of another item such as a departure or arrival time or a moving means and to easily understand the corrected plan.

When an expected arrival time or the like at a selected destination, for example, is delayed greatly due to congestion or the like before starting movement based on a movement plan or during the start of the movement, as described above, the destination setting data may be changed again (for example, replacement of a route to each destination, substitution with another destination, or cancellation of a destination). For example, when an increase in congestion is expected to occur during movement from Lunch to Destination 2, the place of Lunch can be changed to a place in the vicinity of Destination 2.

[Modification 1]

Hereinabove, the action planning system 100 of the first embodiment has been described. In the first embodiment, although the action planning system 100 has been performed by the portable device 2, the action planning system 100 may be performed by the on-board navigation device 3 as another embodiment.

[Modification 2]

Moreover, in the first embodiment, although the portable device 2 accesses the action planning and navigation server system 1 to use the action planning and navigation function of the control unit 10 included in the action planning and navigation server system 1, the control unit 20 of the portable device 2 may include the functions of the action planning and navigation server system 1 as another embodiment. For example, the portable device 2 may include all or some of the functions of the destination setting unit 103, the action plan generation unit 104, the action plan updating unit 105, the display data generation unit 106, and the route distribution unit 107 included in the action planning and navigation server system 1. In this case, the portable device 2 may include all or some of the data files stored in the navigation information storage unit 112, the traffic information storage unit 113, the public transportation information storage unit 114, and the facility information storage unit 115 included in the action planning and navigation server system 1, for example. Moreover, the portable device 2 may access the data stored in the storage unit 20 included in the action planning and navigation server system 1.

[Modification 3]

Moreover, although the server system according to the first embodiment is implemented as a distributed system including the navigation server 1, the FCD server system 4, the traffic information center system 5, and the public transportation information center system 6, the server system may be implemented as a distributed processing system in which the respective functions of these server systems are appropriately distributed to a plurality of servers as another embodiment. Furthermore, the functions of these server systems may be realized on a cloud using a virtual server function or the like.

According to the action planning system 100 described above, the following advantages are obtained.

(1) In the action planning system 100 of the embodiment, the display control unit 206 of the portable device 2 displays, on the display unit 24, the speed display line or display speed information which is plotted on a 2-dimensional coordinate including a time axis and a moving speed coordinate axis such that icons indicating a departure place, an n-th destination (1≤n≤N), and an arrival place are arranged along the time axis, and a moving speed at a corresponding time point is plotted on the moving speed coordinate axis. Due to this, the larger the speed of a moving means, the larger the height of a mountain of the speed display line, and the user can immediately understand with the naked eyes whether the moving speed is slow or fast. By doing so, the user can check whether the movement corresponds to the user's desire during previous planning.

(2) According to the portable device 2 of the embodiment, the display control unit 206 displays, on the display unit 24, the moving speed limit line or moving speed limit information (the expected congestion line or congestion prediction information) based on the speed display line or display speed information indicating a moving speed at each time point of a moving time period from the n-th destination to the (n+1)th destination for each n (1≤n≤N) and the current traffic information and the predicted future traffic information stored in the storage unit 11. In the spatiotemporal action diagram, when the moving speed limit line L2 is on the lower side of the speed display line L1 in the moving time period from the n-th destination to the (n+1)th destination, for example, it means that the user cannot move at the planned moving speed. In this way, by outputting (displaying) the moving speed limit line or moving speed limit information to overlap the spatiotemporal action diagram, it is possible to improve the accuracy of the prediction or the execution support. That is, by outputting (displaying) the moving speed limit information together with the moving speed information, it is possible to check whether the movement can be realized as scheduled and to prevent the unrealizable movement from being scheduled. Furthermore, by adjusting the starting time and the arrival time of the movement, it is possible to schedule a movement which avoids a line of congestion.

(3) According to the action planning system 100 of the embodiment, the moving speed limit line or moving speed limit information (the expected congestion line or congestion prediction information) is generated based on the speed display line or display speed information indicating a moving speed at each time point of a moving time period from the n-th destination to the (n+1)th destination for each n (1≤n≤N) and the past traffic information, the current traffic information, and the predicted future traffic information stored in the storage unit 11. Here, the past traffic information, the current traffic information, and the predicted future traffic information stored in the storage unit 11 are calculated by collecting the FCD such as position information, traffic information, a travel history, and a travel speed of a probe car transmitted in each predetermined period and in each predetermined travel segment from the probe car. As described above, the moving speed limit line or moving speed limit information L2 displayed in the spatiotemporal action diagram is based on the past storage information of the moving speed of a subject vehicle and an other vehicles, prediction information calculated based on the storage information, or prediction information calculated based on movement information of other vehicles traveling at the recent or current time point ahead of the subject vehicle at the recent or current time point. Due to this, since it is possible to increase the accuracy during execution of the action plan related to movement, the degree of user's satisfaction is improved.

(4) According to the action planning system 100 of the embodiment, the destination setting instruction unit 203 of the portable device 2 sets initial values for a moving means and a moving speed from the n-th destination to the (n+1)th destination for each n (1≤n≤N) when creating an action plan which involves a movement. By doing so, it is possible to adjust the action plan and support the execution thereof so that the user's desire is applied more satisfactorily.

(1) In the action planning system 100 of the embodiment, the display control unit 206 of the portable device 2 displays, on the display unit 24, the speed display line or display speed information L1 which is plotted on a 2-dimensional coordinate including a time axis and a moving speed coordinate axis such that icons indicating a departure place, an n-th destination (1≤n≤N), and an arrival place are arranged along the time axis, and a moving speed at a corresponding time point is plotted on the moving speed coordinate axis. Moreover, the user can change the speed display line or display speed information L1 indicating the moving speed from the n-th destination to the (n+1)th destination via the spatiotemporal action diagram displayed on the display unit 24 of the portable device 2 (or the on-board navigation device 3). Due to this, the larger the speed of a moving means, the larger the height of a mountain of the speed display line L1, and the user can immediately understand with the naked eyes whether the moving speed is slow or fast. By doing so, the user can check whether the movement corresponds to the user's desire during previous planning and can adjust the moving speed via the spatiotemporal action diagram when the movement does not correspond to the user's desire. For example, when the user moves along an unfamiliar path, the moving speed can be adjusted to a speed that is approximately 10 to 15% lower than a predetermined upper limit speed.

(2) According to the portable device 2 of the embodiment, the display control unit 206 displays, on the display unit 24, the moving speed limit line or moving speed limit information L2 (the expected congestion line or congestion prediction information) based on the speed display line or display speed information L1 indicating a moving speed at each time point of a moving time period from the n-th destination to the (n+1)th destination for each n (1≤n≤N) and the current traffic information and the predicted future traffic information stored in the storage unit 11. In the spatiotemporal action diagram, when the moving speed limit line L2 is on the lower) side of the speed display line L1 in the moving time period from the n-th destination to the (n+1)th destination, for example, it means that the user cannot move at the planned moving speed. In this way, by outputting (displaying) the moving speed limit line or moving speed limit information L2 to overlap the spatiotemporal action diagram, it is possible to improve the accuracy of the prediction or the execution support. That is, by outputting (displaying) the moving speed limit information L2 together with the moving speed information L1, it is possible to check whether the movement can be realized as scheduled and to prevent the unrealizable movement from being scheduled. Furthermore, by adjusting the starting time and the arrival time of the movement, it is possible to schedule a movement which avoids a line of congestion.

(3) According to the action planning system 100 of the embodiment, the moving speed limit line or moving speed limit information (the expected congestion line or congestion prediction information) is generated based on the speed display line or display speed information indicating a moving speed at each time point of a moving time period from the n-th destination to the (n+1)th destination for each n ($1 \leq n \leq N$) and the past traffic information, the current traffic information, and the predicted future traffic information stored in the storage unit 11. Here, the past traffic information, the current traffic information, and the predicted future traffic information stored in the storage unit 11 are calculated by collecting the FCD such as position information, traffic information, a travel history, and a travel speed of a probe car transmitted in each predetermined period and in each predetermined travel segment from the probe car. As described above, the moving speed limit line or moving speed limit information L2 displayed in the spatiotemporal action diagram is based on the past storage information of the moving speed of a subject vehicle and other vehicles, prediction information calculated based on the storage information, or prediction information calculated based on movement information of other vehicles traveling at the recent or current time point ahead of the subject vehicle at the recent or current time point. Due to this, since it is possible to increase the accuracy during execution of the action plan related to movement, the degree of user's satisfaction is improved.

(4) According to the action planning system 100 of the embodiment, the spatiotemporal action diagram display control unit 2063 can change the moving speed to be increased or decreased based on the information such as a pinch input by the user. In this way, by providing an interface (pinch input or the like) for allowing the user to easily change the speed information, it is possible to adjust the action plan and support the execution thereof so that the user's desire is applied more satisfactorily.

In the foregoing description, although preferred embodiments of the present invention have been described, the present invention is not to be limited to the afore-mentioned embodiments but may be appropriately modified.

EXPLANATION OF REFERENCE NUMERALS

100: Action planning system
1: Action planning and navigation server system
10: Control unit
101: Login processing unit
102: Current position information management unit
103: Destination setting unit
104: Action plan generation unit
105: Action plan updating unit
106: Display data generation unit
1061: Route map generation unit
1062: Time table generation unit
1063: Spatiotemporal action diagram generation unit
107: Route distribution unit
11: Storage unit
111: User information storage unit
112: Navigation information storage unit
113: Traffic information storage unit
114: Public transportation information storage unit
115: Facility information storage unit
116: Moving means provision information storage unit
12: Communication unit

2: Portable device
20: Control unit
201: Connection processing unit
202: Position information updating unit
203: Destination setting instruction unit
204: Action plan generation instruction unit
205: Action plan update instruction unit
206: Display control unit
2061: Route map display control unit
2062: Time table display control unit
2063: Spatiotemporal action diagram display control unit
207: Route guidance unit
21: Storage unit
22: Communication unit
23: Sensor unit
24: Display unit
25: Input unit
26: Near-field communication unit
3: On-board navigation device
30: Control unit
301: Connection processing unit
302: Position information updating unit
303: Destination setting instruction unit
304: Action plan generation instruction unit
305: Action plan update instruction unit
306: Display control unit
3061: Route map display control unit
3062: Time table display control unit
3063: Spatiotemporal action diagram display control unit
307: Route guidance unit
31: Storage unit
32: Communication unit
33: Sensor unit
34: Display unit
35: Input unit
36: Near-field communication unit
4: FCD server system
5: Traffic information center system
6: Public transportation information center system
7: Network

What is claimed is:

1. An electronic apparatus that displays action plan information which involves a movement within an arbitrary period and execution support information of the action plan which involves the movement, the information including staying times at desired stopover destinations of a user, the electronic apparatus comprising:
   a display unit configured as a display device; and
   a display control unit, wherein the display control unit is configured to:
      display a time coordinate axis on the display device,
      display destinations and respective staying times along the time coordinate axis on the display device, and
      display, for an arbitrary movement included in the action plan information, speed information of the movement at an arbitrary period along the time coordinate axis on the display device so that the user can immediately understand a degree of a moving speed with naked eyes,
   wherein the display control unit is further configured to accept operation input by the user to correct speed information of a movement between the destinations at the arbitrary period.

2. The electronic apparatus according to claim 1, wherein the display control unit is further configured to accept operation input by the user to correct speed information of a movement between arbitrary destinations.

3. The electronic apparatus according to claim 1, wherein
the action plan information further includes a departure time and an arrival time of each of the destinations, and
in a case of receiving the correction input of the speed information of the movement, the display control unit does not perform correcting accompanied with the correction input for a departure time or an arrival time that is fixedly set.

4. The electronic apparatus according to claim 2, wherein
the action plan information further includes a departure time and an arrival time of each of the destinations, and
in a case of receiving the correction input of the speed information of the movement, the display control unit does not perform correcting accompanied with the correction input for a departure time or an arrival time that is fixedly set.

* * * * *